May 14, 1940. A. H. WOODWARD ET AL Re. 21,451

VENDING MACHINE

Original Filed July 15, 1935 19 Sheets-Sheet 1

Inventors:
Arthur H. Woodward
William E. Richmond
Ernest H. Thompson

By: Brown, Jackson, Boettcher & Dienner.

Att'ys.

May 14, 1940. A. H. WOODWARD ET AL Re. 21,451

VENDING MACHINE

Original Filed July 15, 1935 19 Sheets-Sheet 2

Inventors:
Arthur H. Woodward
William E. Richmond
Ernest H. Thompson

By: Brown, Jackson, Boettcher & Dienner,
Att'ys

May 14, 1940. A. H. WOODWARD ET AL Re. 21,451

VENDING MACHINE

Original Filed July 15, 1935 19 Sheets-Sheet 3

Inventors:
Arthur H. Woodward
William E. Richmond
Ernest H. Thompson
By: Brown, Jackson, Boettcher & Dienner,
Attys.

May 14, 1940. A. H. WOODWARD ET AL Re. 21,451
VENDING MACHINE
Original Filed July 15, 1935 19 Sheets-Sheet 4
Fig. 21.
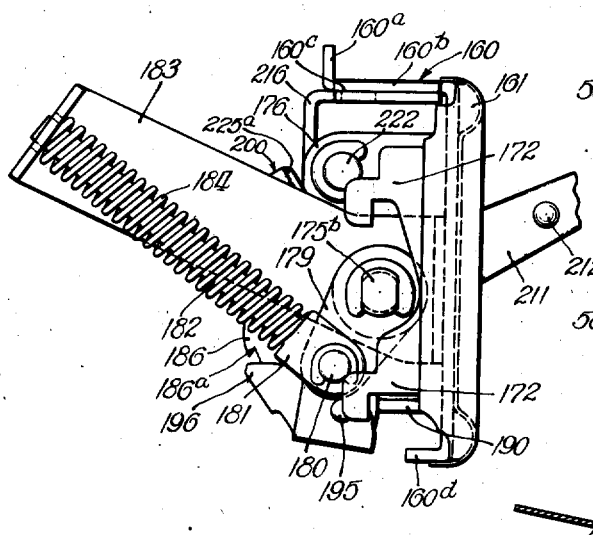
Fig. 4.
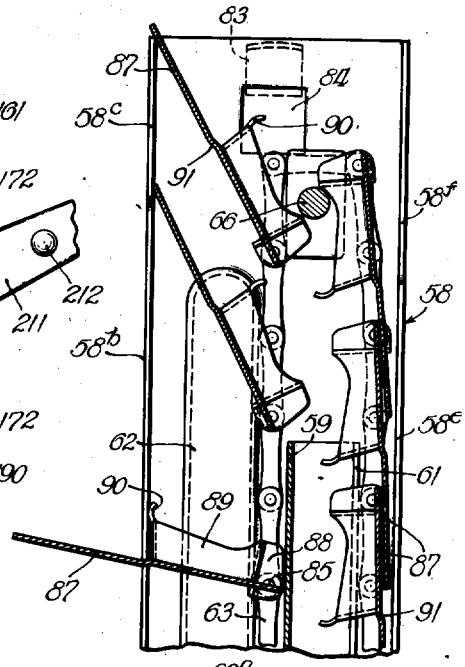
Fig. 22.
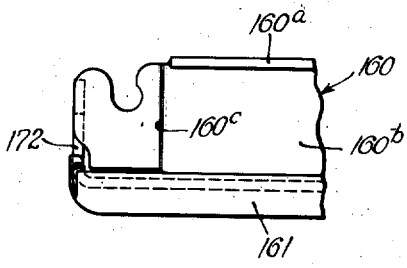
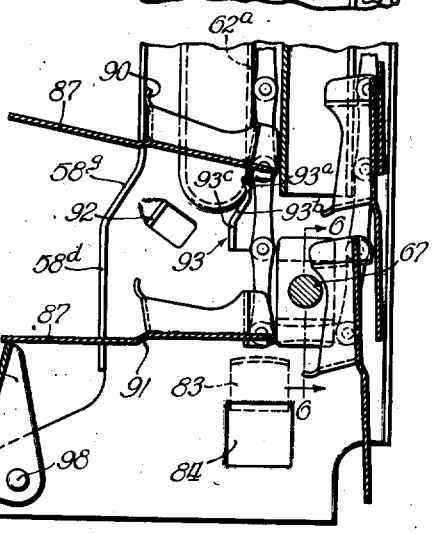
Fig. 23.
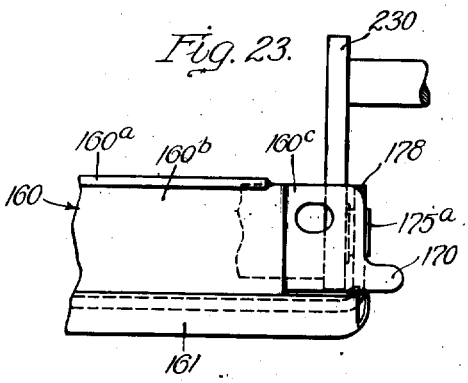
Inventors:
Arthur H. Woodward
William E. Richmond
Ernest H. Thompson
By: Brown, Jackson, Boettcher & Dienner,
Attys.

VENDING MACHINE

Original Filed July 15, 1935 19 Sheets-Sheet 5

Inventors:
Arthur H. Woodward
William F. Richmond
Ernest H. Thompson
By: Brown, Jackson, Boettcher & Dienner,
Attys.

VENDING MACHINE

Original Filed July 15, 1935 19 Sheets-Sheet 6

Inventors:
Arthur H. Woodward
William E. Richmond
Ernest H. Thompson

By: Brown, Jackson, Boettcher + Dienner,

Attys.

May 14, 1940. A. H. WOODWARD ET AL Re. 21,451

VENDING MACHINE

Original Filed July 15, 1935 19 Sheets-Sheet 7

Inventors:
Arthur H. Woodward
William E. Richmond
Ernest H. Thompson
By: Brown, Jackson, Boettcher & Dienner
Attys.

VENDING MACHINE

Original Filed July 15, 1935 19 Sheets-Sheet 8

Inventors:
Arthur H. Woodward
William E. Richmond
Ernest H. Thompson
By: Brown, Jackson, Boettcher & Dienner,
Attys.

VENDING MACHINE

Original Filed July 15, 1935 19 Sheets-Sheet 9

Inventors:
Arthur H. Woodward
William E. Richmond
Ernest H. Thompson
By: Brown, Jackson, Boettcher & Dinner.
Attys.

VENDING MACHINE

Original Filed July 15, 1935 19 Sheets-Sheet 10

Inventors:
Arthur H. Woodward
William E. Richmond
Ernest H. Thompson
By: Brown, Jackson, Boettcher & Dienner,
Attys.

May 14, 1940. A. H. WOODWARD ET AL. Re. 21,451

VENDING MACHINE

Original Filed July 15, 1935 19 Sheets-Sheet 11

Inventors:
Arthur H. Woodward,
William E. Richmond
Ernest H. Thompson
By: Brown, Jackson, Boettcher & Dienner,
Attys

VENDING MACHINE

Original Filed July 15, 1935 19 Sheets-Sheet 12

Inventors:
Arthur H. Woodward
William E. Richmond
Ernest H. Thompson
By: Brown, Jackson, Boettcher & Dienner
Attys.

May 14, 1940. A. H. WOODWARD ET AL Re. 21,451

VENDING MACHINE

Original Filed July 15, 1935 19 Sheets-Sheet 13

Inventors:
Arthur H. Woodward
William E. Richmond
Ernest H. Thompson
By: Brown, Jackson, Boettcher + Dienner,
Attys.

VENDING MACHINE
Original Filed July 15, 1935 19 Sheets-Sheet 14
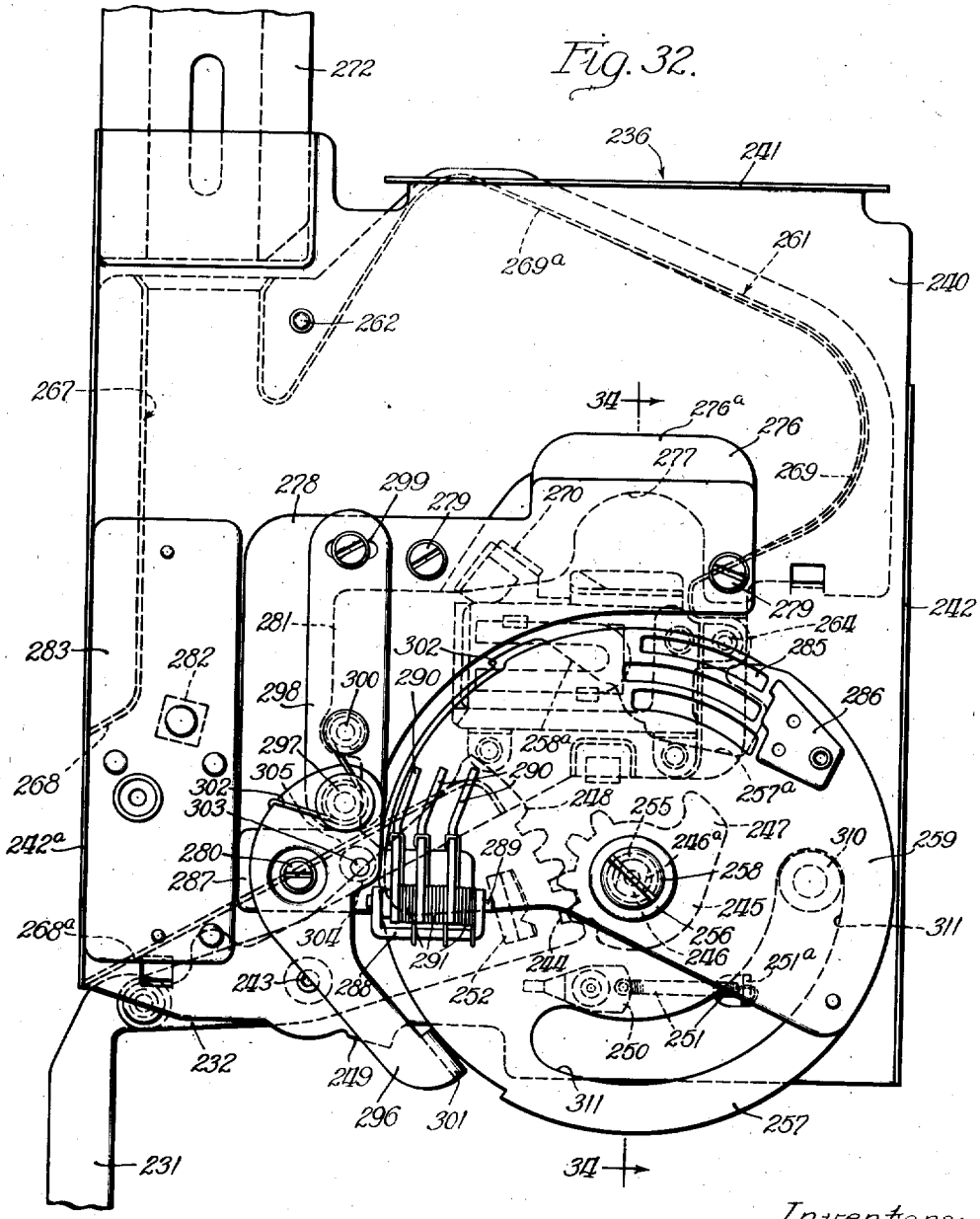
Inventors:
Arthur H. Woodward
William E. Richmond
Ernest H. Thompson
By: Brown, Jackson, Boettcher & Dienner,
Att'ys.

May 14, 1940. A. H. WOODWARD ET AL Re. 21,451
VENDING MACHINE
Original Filed July 15, 1935 19 Sheets-Sheet 15
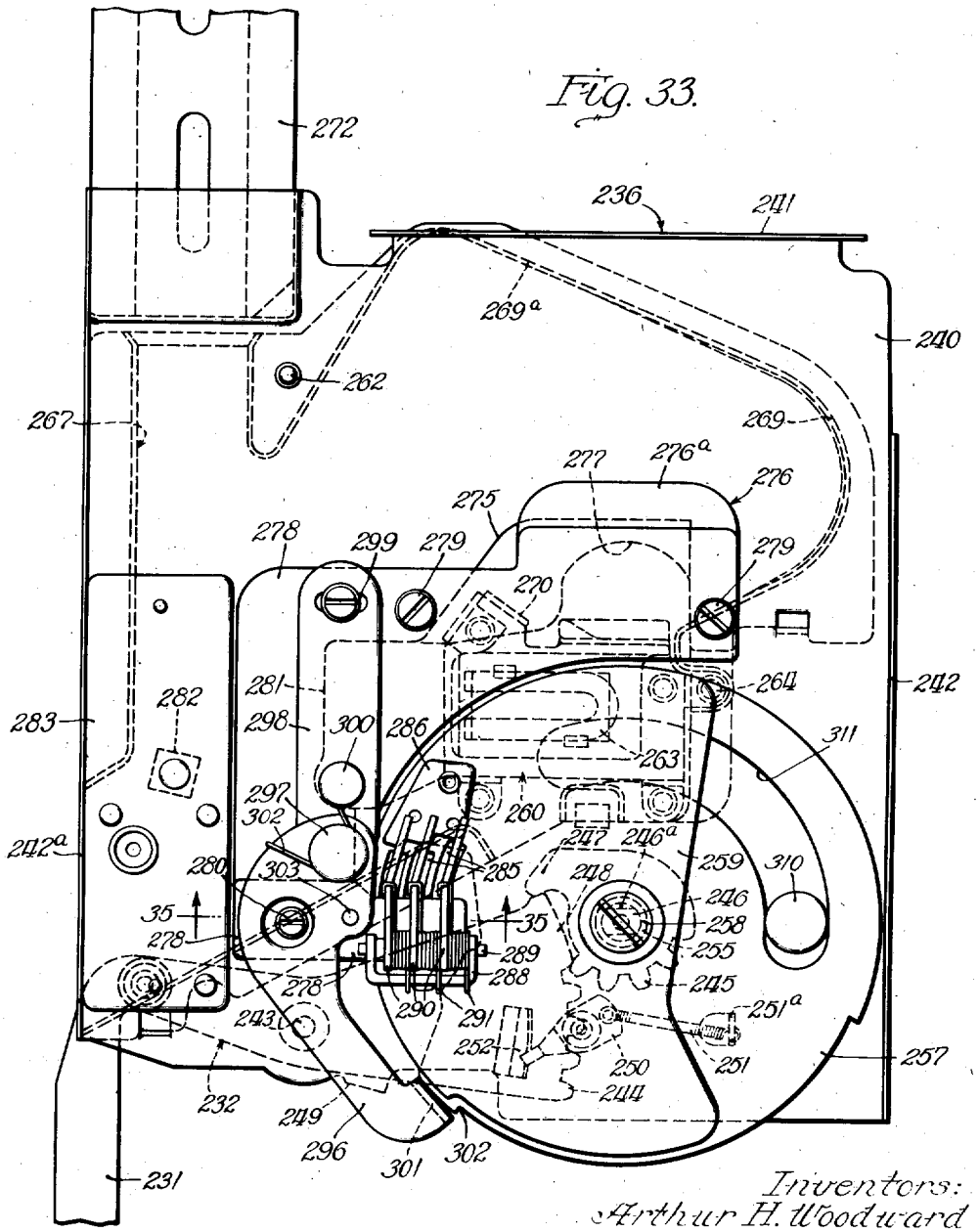
Inventors:
Arthur H. Woodward
William E. Richmond
Ernest H. Thompson
By: Brown, Jackson, Boettcher & Dienner,
Att'ys.

VENDING MACHINE

Original Filed July 15, 1935 19 Sheets-Sheet 16

Inventors:
Arthur H. Woodward
William E. Richmond
Ernest H. Thompson
By: Brown, Jackson, Boettcher & Dienner,
Attys.

VENDING MACHINE

Original Filed July 15, 1935 19 Sheets-Sheet 17

Inventors:
Arthur H. Woodward
William E. Richmond
Ernest H. Thompson
By: Brown, Jackson, Boettcher & Dienner,
Attys.

VENDING MACHINE

Original Filed July 15, 1935 19 Sheets-Sheet 18

Inventors:
Arthur H. Woodward
William E. Richmond
Ernest H. Thompson
By: Brown, Jackson, Boettcher & Dienner,
Attys.

VENDING MACHINE

Original Filed July 15, 1935 19 Sheets-Sheet 19

Inventors:
Arthur H. Woodward
William E. Richmond
Ernest H. Thompson
By: Brown, Jackson, Boettcher & Dienner,
Attys.

Reissued May 14, 1940

Re. 21,451

UNITED STATES PATENT OFFICE 21,451

VENDING MACHINE

Arthur H. Woodward, Winnetka, William E. Richmond, Wilmette, and Ernest H. Thompson, Winnetka, Ill., assignors to International Register Company, Chicago, Ill., a corporation of Illinois Original No. 2,113,120, dated April 5, 1938, Serial No. 31,382, July 15, 1935. Application for reissue August 4, 1939, Serial No. 288,410

21 Claims. (Cl. 312—96)

This invention relates to vending machines, and has to do with machines provided with article delivering mechanisms which may be actuated by coin controlled operating means.

Our invention is directed generally to a vending machine of exceptionally compact construction having improved delivering and operating mechanisms. More specifically, one object is to provide article containing and delivery means of comparatively simple construction and operation and which occupies relatively small space. A further object is the provision of improved article controlled empty lock means controlled by the weight of an article to be vended, for controlling operation of the delivering mechanisms. Further objects and advantages of our invention will appear from the detail description.

In the drawings:

Figure 4 is a section taken substantially on line 4—4 of Figure 3;

Figure 21 is an elevational view of the left end of the keyboard and associated parts;

Figure 22 is a fragmentary plan view of the left end of the keyboard;

Figure 23 is a fragmentary plan view of the right end of the keyboard;

Figure 32 is an outer side view, on an enlarged scale, of the coin control mechanism and associated parts, with the coin receiving disc in normal position;

Figure 33 is a view similar to Figure 32, but with the coil receiving disc in coin discharging position;

Figure 1:
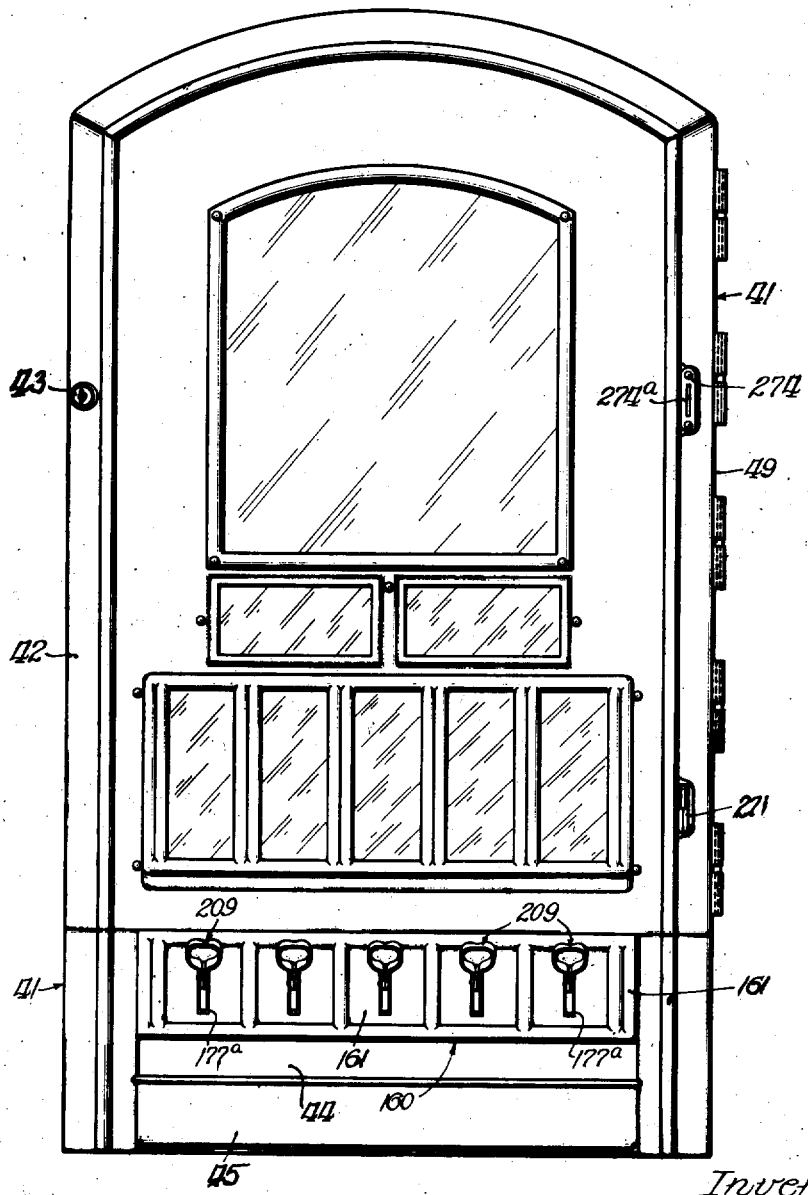
Figure 1 is a front view of a vending machine embodying our invention.

The various mechanisms of the machine are housed in a suitable casing 41, closed by a door 42, hinged to the casing at one side and provided with appropriate locking means including a cylinder lock 43 of known type. A delivery chute 44 is disposed in the lower portion of casing 41 (Figure 31) for delivering the articles, as dispensed, into a receiving trough 45 extending across the casing at the lower end thereof and opening exteriorly of the casing. A plate 46 of approximately L-shape in cross-section extends transversely of the casing above chute 44 and serves to prevent access, by means of the trough and the chute, to the operating mechanisms within the casing. The upper edge portion of plate 46 is shaped to provide a channel bar 47, one end of which is secured, by a U-shaped bracket 48, to side wall 49 of casing 41, the other end of channel bar 47 being secured to the opposite side wall 50 of the casing by a bracket 51. A channel bar 52 is suitably secured in the casing adjacent the top thereof and parallel with bar 47. A plate 53 is removably secured to the front flange of channel bar 52 and depends therefrom, this plate being provided, adjacent its lower edge, with slots 54 which receive pins 55 projecting forward from article receiving stacks 56 mounted within the casing, plate 53 contacting the front faces of the stacks and resisting any tendency of the upper portions thereof to move outward towards the front of the casing.

Each of the stacks 56 includes a frame comprising opposed front and back channel members 57 and 58, respectively, connected by a plate 59, the marginal portions of which are shaped to provide opposed channel elements 60 and 61 suitably secured to the channel members 57 and 58, respectively. Channel member 58 is of greater width than member 57 and is provided with an inwardly projecting channel element 62, one side flange 62*a* of which is aligned with one side flange of channel member 57. The other side flange 62*b* of channel element 62 is spaced from flange 58*b* of channel member 58 and defines therewith a guide channel. Channel elements 60 and 61 of plate 59 define, with channel member 57 and channel member 58 and channel element 62 thereof, vertical side channels which receive the runs of chains 63 of an endless conveyor structure.

Figure 6:
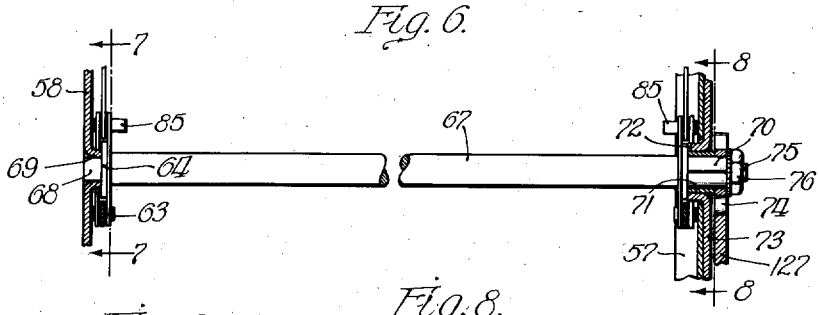
Figure 6 is a transverse sectional view of one of the article containing stacks, taken substantially on line 6—6 of Figure 4, parts being shown in elevation and parts being omitted for clearness of illustration.
Figure 7:
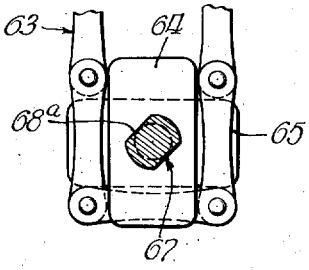
Figure 7 is a sectional view taken substantially on line 7—7 of Figure 6, on an enlarged scale.
Figure 8:
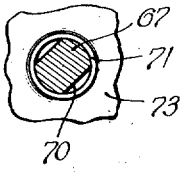
Figure 8 is a sectional view taken substantially on line 8—8 of Figure 6.

Referring more particularly to Figure 4, plate 59 and channel element 62 terminate short of the top and the bottom of the channel members 57 and 58, the upper edge of plate 59 being an appreciable distance below the top of channel element 62. The chains 63 are of known type and each comprises (Figures 6 and 7) alternately arranged single links and pairs of links, the ends of which are disposed in overlapping relation and are connected together by suitable pivot pins. These chains pass about sprockets comprising two rectangular plates 64 and 65 secured upon upper and lower shafts 66 and 67, adjacent the inner faces of channel members 57 and 58. Plates 64 and 65 are so disposed that, when the end portions of plate 65 extend between the links of two adjacent pairs thereof, one end portion of plate 64 extends across the inner face of the single link connecting the pairs of links so as to confine the single link between plate 64 and the inner face of channel member 57 or 58. Shaft 67 is provided, at one end, with a reduced stud 68 rotatably mounted in a cylindrical collar 69 extending inward from channel member 58. The portion of shaft 67 between stud 68 and the main body of the shaft, designated 68*a*, is squared and fits tightly into corresponding openings in the plates 64 and 65. At its other end shaft 67 is provided with an elongated squared element 70 extending through a bushing 71 loosely mounted in a cylindrical collar 72 which projects inward from a bracket plate 73 through channel member 57. Plates 64 and 65 are secured upon squared element 70 and the latter projects beyond the forward face of bracket plate 73 for reception of a pinion 74 fitting snugly upon element 70. The end of the shaft 67 beyond element 70 is reduced and threaded to provide a screw stud 75 upon which screws a nut 76 for retaining the pinion upon the shaft, there preferably being a lock washer of known type disposed between the nut and the pinion. The upper shaft 66 is rotatably mounted at each end in the channel members 57 and 58 in the same manner as shaft 67 is mounted in channel member 58. Shaft 67 is the drive shaft of the conveyor and it will be seen that upon rotation of this shaft the conveyor chains 63 will be driven in the same direction and at the same speed.

Figure 2:
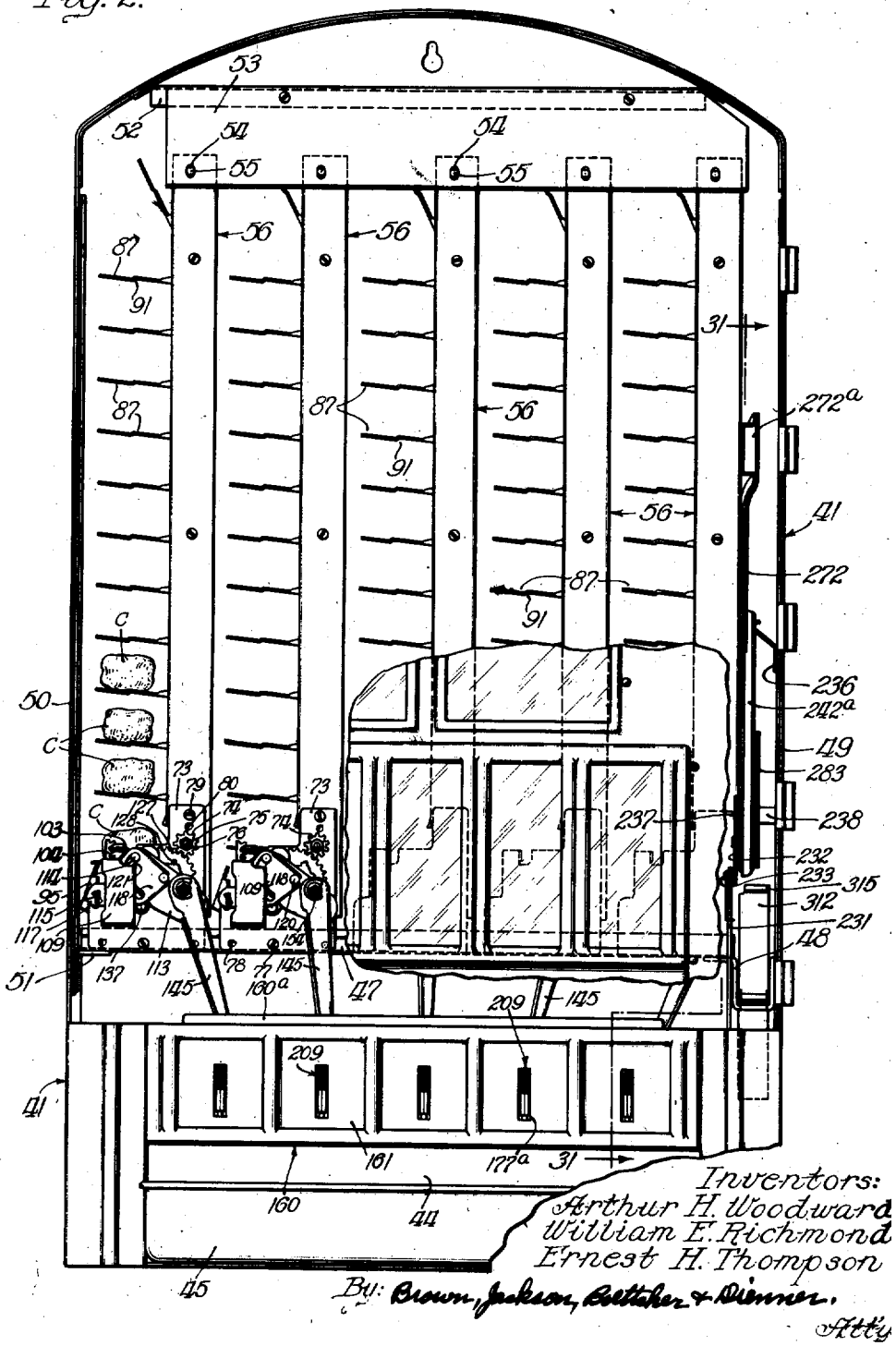
Figure 2 is a view similar to Figure 1 but with the major portion of the door broken away, other parts being broken away and parts being shown in section.
Figure 3:
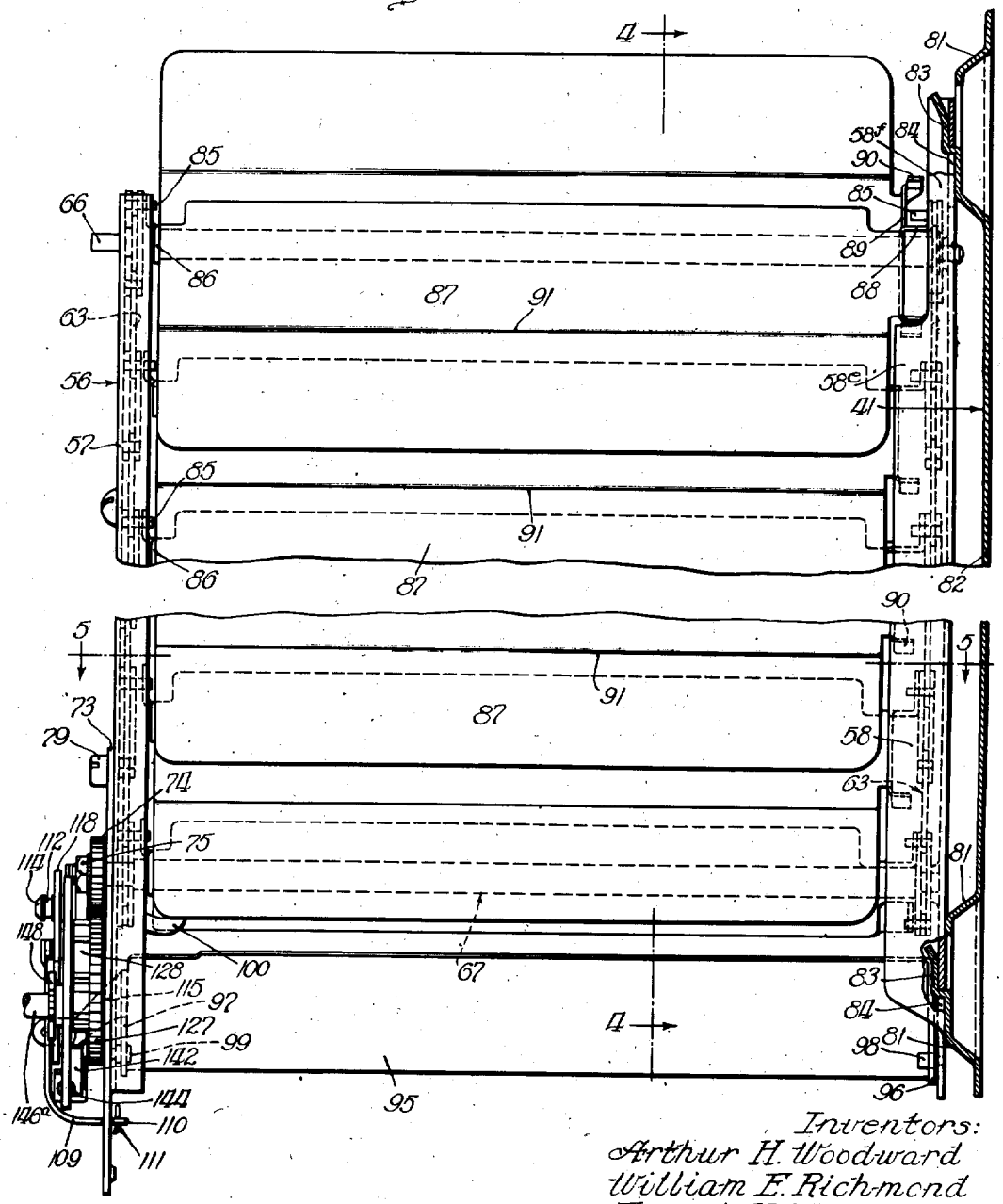
Figure 3 is a side view of one of the article containing stacks, and associated parts, on an enlarged scale and partly broken away, parts being shown in section.
Figure 5:
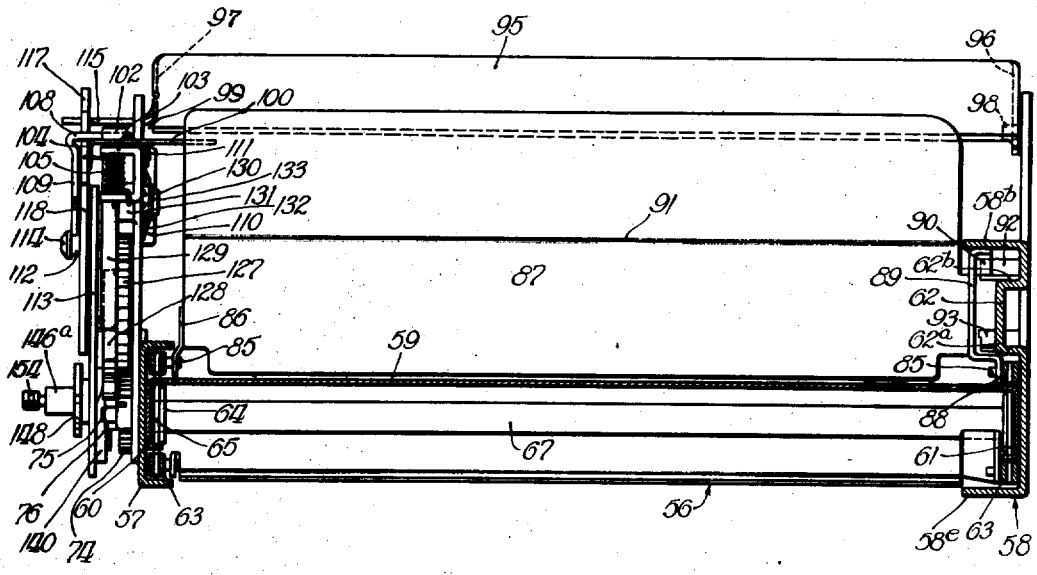
Figure 5 is a section taken substantially on line 5—5 of Figure 3.
Figure 10:
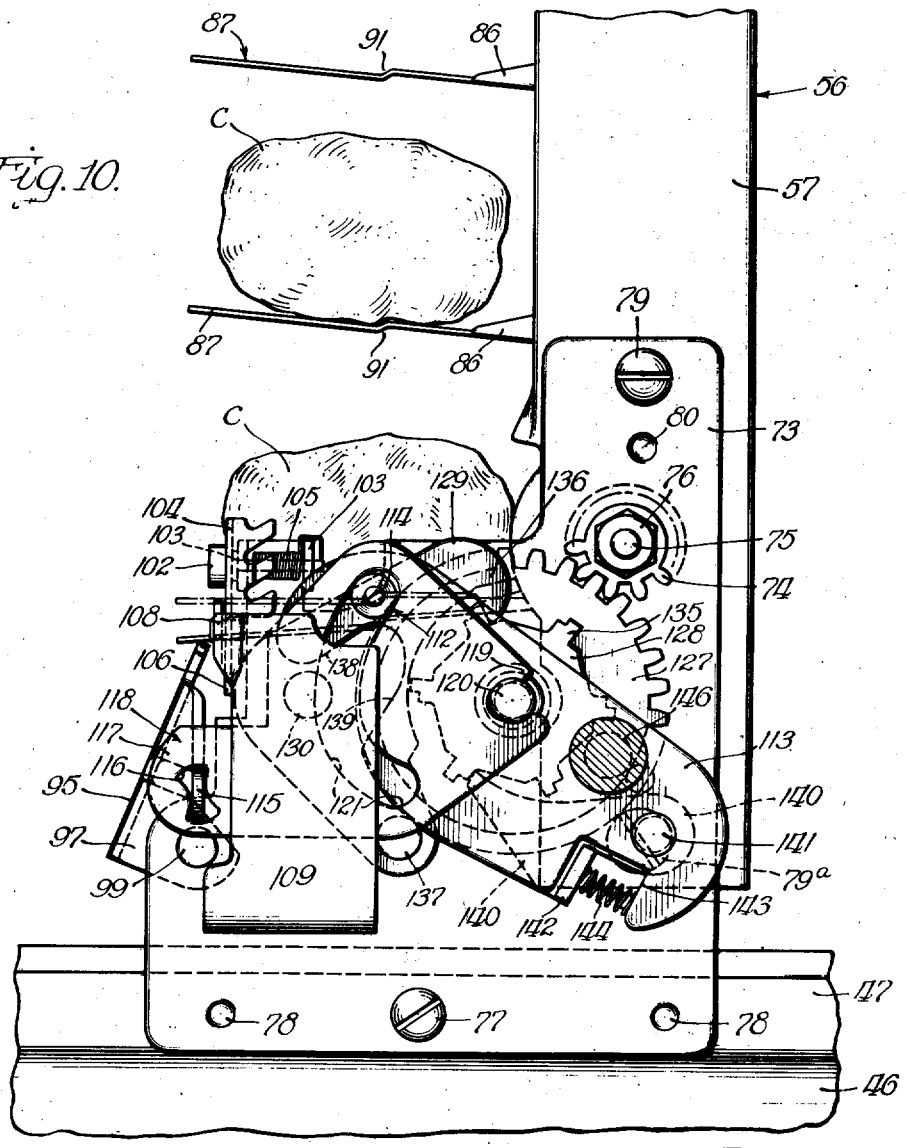
Figure 10 is a front view, on an enlarged scale, of the lower portion of one of the stacks and associated parts, showing the normal condition of the stack operating and delivering mechanisms.
Figure 11:
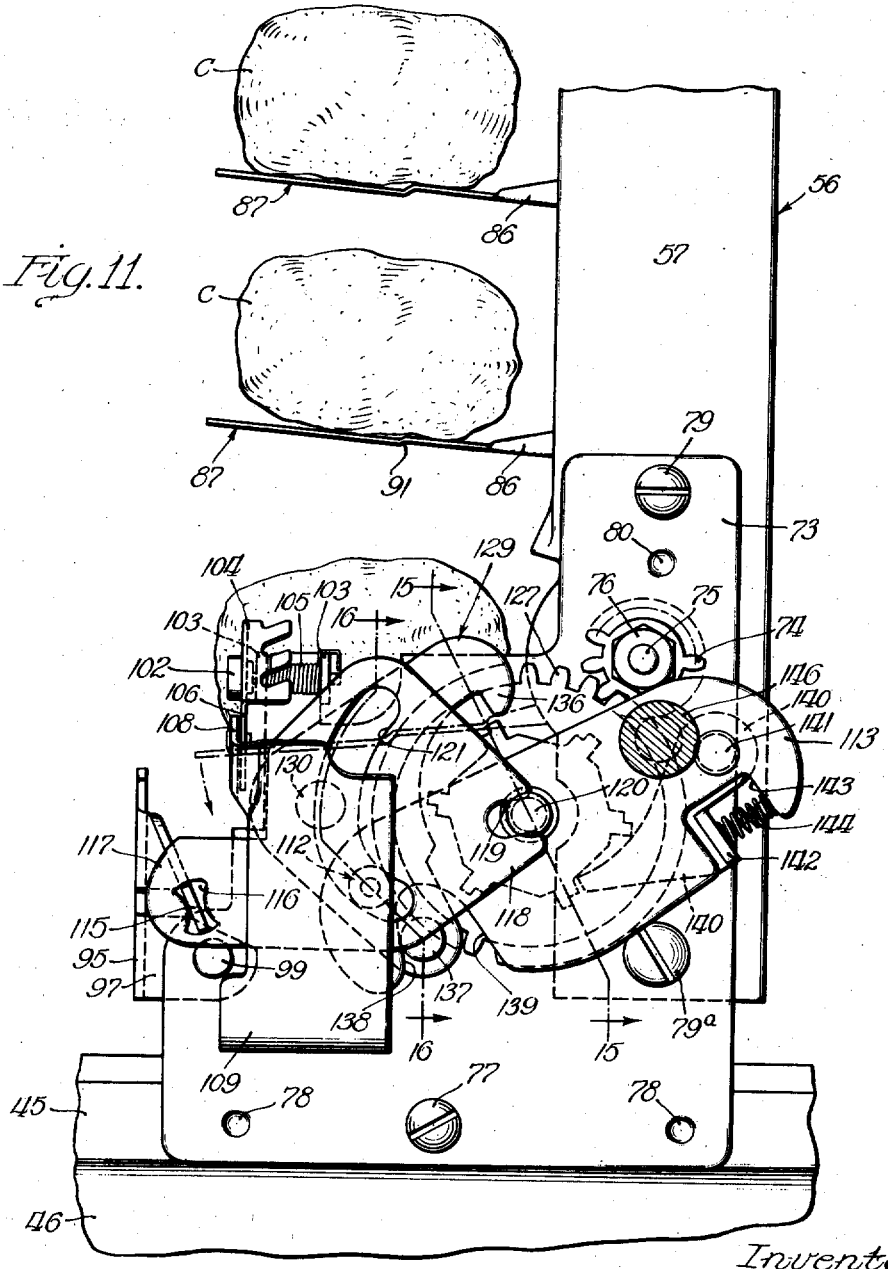
Figure 11 is a view similar to Figure 10 but showing the condition of the stack operating and delivering mechanisms when operated for delivering an article.

Bracket plate 73 is suitably secured to the front face of channel member 57 and depends therefrom, the lower portion of this bracket plate being rigidly secured to channel bar 47, conveniently by means of a screw 77 which threads into channel bar 47, and bosses 78 pressed in plate 73 and fitting snugly into corresponding openings in channel bar 47. Plate 73 is rigidly secured to channel member 57 by means of a screw 79 and a boss 80 pressed from the plate and fitting snugly into a corresponding opening in member 57. Any other suitable or appropriate means may be employed for securing plate 73 to the channel member 57 and channel bar 47. Referring more particularly to Figures 3 and 4, bosses 81 are pressed inward from back wall 82 (Fig. 3) of casing 41, and an upwardly projecting and inwardly offset tongue 83 is struck from each of these bosses. Rear channel member 58 of the frame of each stack 56 is provided with two openings 84 adjacent the top and the bottom thereof, which openings receive the tongues 83. In this manner, the stack 56 is hung from the back wall of the casing and is also supported from channel bar 47, through bracket plate 73, as shown in Figures 2, 10 and 11. By removing plate 53 (Figure 2) and screw 77, and disconnecting a portion of the operating mechanism, as will be later described, the stack 56 may be disengaged from the tongues 83, by lifting the stack vertically a short distance, and removed as a unit from the casing. In this manner, we provide simple and efficient means for rigidly supporting the stacks within the casing while facilitating independent removal and replacement thereof.

Figure 9:
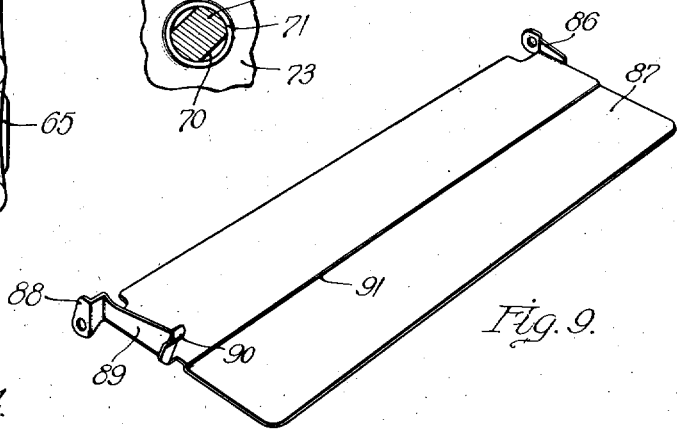
Figure 9 is a detail perspective view of one of the article receiving shelves of the article containing stacks.

Certain of the pivot pins of the chains 63, in this case every second pin, are extended to provide inwardly projecting pivot studs 85. One of the studs 85 projects through a tab 86 extending upward from a shelf 87 of substantially rectangular shape in plan, this tab being at the end of the shelf which is adjacent channel member 57. The opposite one of the two aligned studs projects through a tab 88 formed integral with a flange 89 projecting upward from the other end of shelf 87 and conveniently formed integral with the shelf. A guide tab 90 projects from the other end of flange 89 substantially at right angles thereto and toward channel member 58. The end portion of tab 90 remote from shelf 87 is offset away from tab 88 and is preferably rounded, as shown in Figure 9. The shelf 87 is preferably slightly bent or offset at its midportion and lengthwise, at 91.

Referring to Figure 4, upper portion 58*c* of flange 58*b* of channel member 58 is of increased width, and upper portion 58*f* of flange 58*e* of this channel member is of decreased width, it being noted that portion 58*f* of flange 58*e* is of considerably greater length than portion 58*c* of flange 58*b*. It will also be noted that the lower portion of channel member 58 is of increased width, lower portion 58*d* of flange 58*b* being offset away from flange 58*e* and connected to flange 58*b* by an inclined shoulder 58*g*. Two tabs 92 and 93 are struck from the lower portion of channel member 58 and project forwardly therefrom. Tab 92 is straight and is inclined downward toward lower portion 58*d* of flange 58*b*. Tab 93 comprises an upper portion 93*a* of arcuate shape which overlies the inner face of channel element 62 and extends from the lower portion thereof approximately in the plane of flange 62*a*, a shoulder 93*b* inclined downward toward portion 58*d* of flange 58*b*, and a lower straight portion 93*c* extending vertically from the lower end of shoulder 93*b*.

A shelf supporting plate 95, provided at one end with a flange 96 and at its other end with a flange 97 (Figure 10) is pivotally mounted on a horizontal axis, by means of pivot pins 98 and 99, on the lower end portion of channel member 58 and bracket plate 73, respectively. The plate 95 is normally disposed in the position shown in Figure 4 so as to extend beneath the outer edge portion of a shelf 87 when the latter arrives at its lowermost position in the travel of the conveyor, this position of the shelf being at the delivery station of the stack. Suitable means is provided for moving the shelf supporting bar 95 from beneath shelf 87, thus permitting the latter to swing downward about its pivot axis for delivering an article from the shelf into chute 44 and thence to trough 45.

Figure 12:
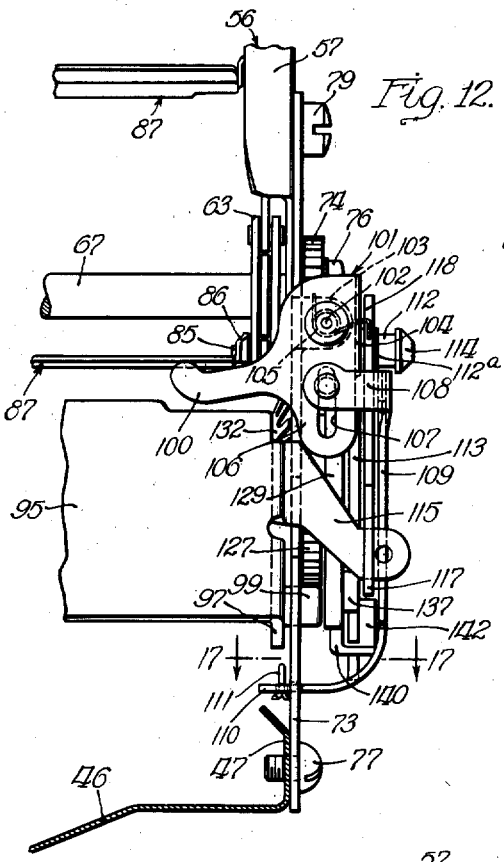
Figure 12 is a fragmentary front view, on an enlarged scale, of the lower portion of one of the stacks and associated parts, partly in section, showing the condition of the operating and delivering mechanisms when a shelf arrives at the delivery station but prior to release of the shelf from the guiding and supporting means of the stack frame.
Figure 13:
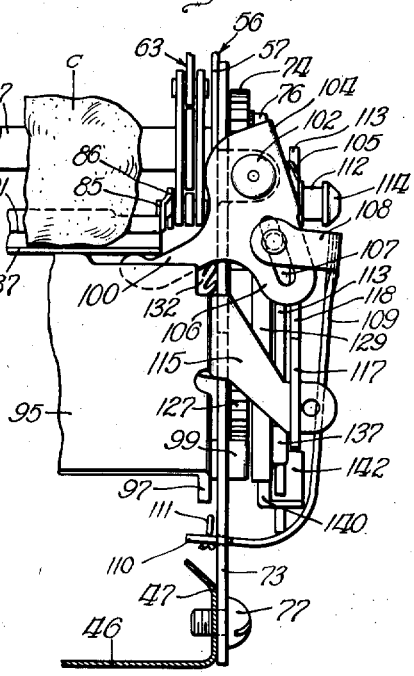
Figure 13 is a view similar to Figure 12, but with the shelf at the delivery station slightly advanced and released from the shelf guiding and supporting means of the stack frame.

Shaft 67 of the conveyor structure is intermittently operated for advancing the shelves an appropriate distance step by step. When the shelf at the delivery station is released, it swings downward into vertical position, the shelves at the upward moving run of the conveyor being disposed vertically and in overlapping relation, as shown, in which relation they are held by gravity. As the topmost shelf of the upwardly moving run is moved about shaft 66 into the position of the topmost shelf of the downwardly moving run, the shelf is turned through an arc and then swings downward by gravity, about its pivot axis, so as to rest against the widened upper portion 58*c* of flange 58*b*. During this turning movement of the shelf, the cut-out or narrowed portion 58*f* of flange 58*e* accommodates flange 89, and tab 90 thereof, of the shelf. When the shelf moves downward beyond widened portion 58*c* of flange 58*b*, it swings downward on its pivot axis until tab 90 of flange 89 contacts the inner face of flange 58*b*, the shelf being then held in substantially horizontal position, but at a slight downward inclination toward the chains of the conveyor, as shown in Figure 4. In the continued downward travel of the shelf, the lower edge of tab 90 contacts the upper face of tab 92, the upper portion of tab 90 remaining in contact with the inner face of flange 58*b* until the lower edge of this tab passes off of tab 92. Tab 90 then contacts the upper portion of shoulder 58*g* and, at this time, tab 88 of the shelf contacts upper portion 93*a* of tab 93. The shelf is thus held against downward tilting until tab 88 travels along the inclined shoulder 93*b* of tab 93 into contact with portion 93*c* of this tab, at which time the shelf occupies the dotted line position of Figure 10, into which position it has been gradually tilted in the travel of tab 88 along shoulder 93*b* of tab 93. The shelves 87 of the downwardly moving run of the conveyor, and which project outward substantially horizontally therefrom, support the articles to be vended, such as candy bars C (Figures 10 and 11). When tab 88 of the shelf moves downward out of contact with tab 93, the shelf swings downward about its pivot axis into contact with arm 100 (Figure 12) of a trip lever 101 pivotally mounted on a pin 102 extending through spaced tabs 103 (Figure 11) projecting outward from bracket plate 73. Trip lever 101 is provided with a flange 104 having spaced slots 104′ therein for reception of one end of a torsion coil spring 105 disposed about pivot pin 102, the other end of this spring being engaged over tab 103 remote from flange 104. Spring 105 urges trip lever 101 in a clockwise direction, as viewed in Figure 12, and serves to cushion the downward swinging movement of shelf 87. The weight of the article C upon the shelf is sufficient to overcome the resistance of spring 105 and downward swinging movement of the shelf continues, cushioned by trip lever 101 and spring 105, until the shelf contacts the upper edge of holding bar 95, as shown in Figure 10. The shelf and the articles thereon are thus positioned at the delivery station and, upon movement of bar 95 into inoperative position, the shelf swings downward about its pivot axis and deposits the article into the delivery chute, as previously noted.

Figure 14:
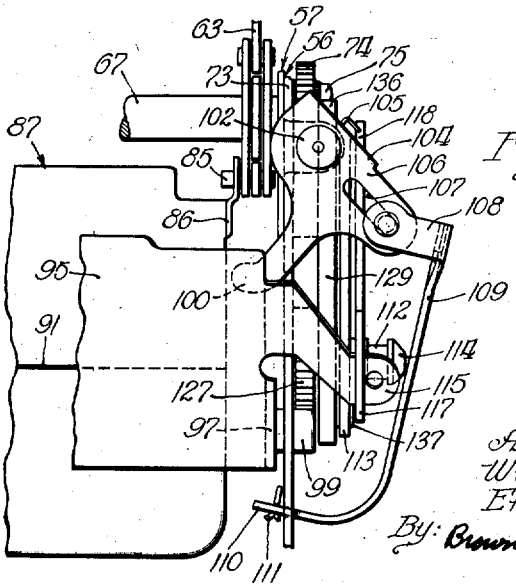
Figure 14 is a view similar to Figure 12, but with the stack operating and delivering mechanisms in the condition obtaining upon delivery of an article.

Arm 106 of trip lever 101 is connected by pin and slot means 107 to the rear end of an arm 108 projecting rearward from one edge of a locking plate 109 (Figures 10 to 14). Plate 109 is of approximately L-shape and is provided, at its lower end, with a reduced tongue 110 which extends loosely through an opening in bracket plate 73 and is held against withdrawal therefrom by a stop member such as a cotter pin 111. Plate 109 normally occupies the position shown in Figure 12, with its upper edge disposed a short distance below and in the path of travel of a stud 112 secured to a conveyor driving plate 113 pivoted on the bracket plate 73, this stud being provided at its outer end with an enlarged frustoconical head 114. When an empty shelf 87 rests upon arm 100 of trip lever 101, this lever remains in its normal position shown in Figure 12, the weight of the shelf alone being insufficient to overcome the tension of spring 105, and plate 109 remains in its normal position, thus preventing downward movement of stud 112 to any appreciable extent and in this manner locking driving plate 113 against effective rotation in a counterclockwise direction as viewed in Figure 10. On the other hand, if a shelf 87 containing an article C contacts arm 100 of trip lever 101, the trip lever is swung in a counterclockwise direction, as viewed in Figure 12, into the position of Figure 13, thus moving the plate 109 out of the path of stud 112 so as to permit of driving plate 113 being turned in a counterclockwise direction. During this movement of plate 113 head 114 of stud 112 contacts the inner face of plate 109 and moves the latter outward so as to completely withdraw arm 100 of trip lever 101 from beneath shelf 87, after which bar 95 is moved outward from beneath the shelf and permits the latter to swing downward about its pivot axis into vertical position, as shown in Figure 14.

The shelf supporting bar 95 is provided, at the same end thereof at which flange 97 is located, and above the later, with an angularly disposed and forward projecting arm 115 which fits loosely through a suitably shaped opening 116 (Figure 11) in a finger 117 of a cam plate 118 disposed at the inner face of locking plate 109 and in part overlying the conveyor driving plate 113. Plate 118 is provided, remote from finger 117, with a slot 119 which fits snugly about the reduced neck of a stud 120 secured in bracket plate 73, this stud providing the pivot about which plate 113 turns. Plate 118 is further provided with a cam slot 121 in which shoulder 112a (Figure 16) of stud 112 operates. Slot 121 is so formed that plate 118 is moved toward the left, as viewed in Figure 11, thus swinging the bar 95 outward from beneath shelf 87 as plate 113 approaches the limit of its movement in a counterclockwise direction, and shortly after arm 100 of trip lever 101 has been swung outward sufficiently to clear the shelf, as shown in Figure 11. Upon return of the conveyor driving plate 113 to its normal position, shown in Figure 10, bar 95 is returned to normal position and, as soon as stud 112 passes above the upper edge of plate 109, the latter plate and the trip lever 101 are returned to their normal positions, shown in Figure 12, by spring 105. The delivering and controlling mechanism is thus conditioned for delivery of another article upon subsequent operation of the conveyor.

Figure 15:
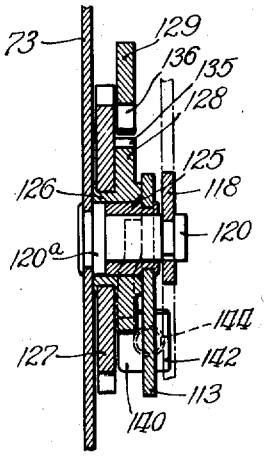
Figure 15 is a section taken substantially on line 15—15 of Figure 11, parts being shown in elevation.
Figure 16:
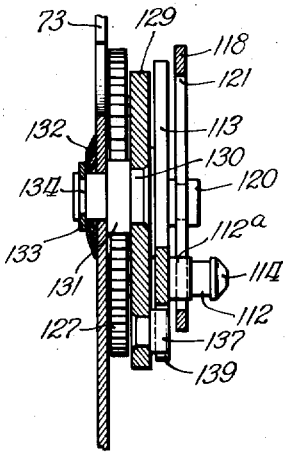
Figure 16 is a section taken substantially on line 16—16 of Figure 11, parts being shown in elevation.
Figure 17:
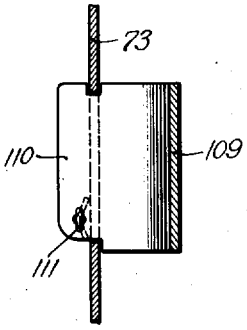
Figure 17 is a section taken substantially on line 17—17 of Figure 12, parts being omitted for clearness of illustration.
Figure 18:
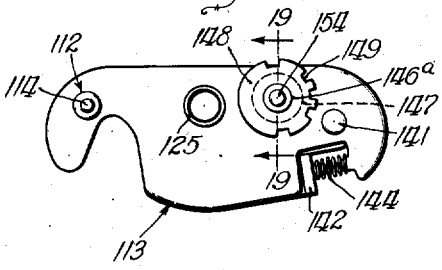
Figure 18 is a detail view of the stack driving plate and associated parts, parts being omitted for clearness of illustration.

Referring to Figures 15 and 16, the conveyor driving plate 113 is provided with a bushing 125 suitably secured thereto and projecting from the inner face thereof, this bushing being rotatably mounted upon stud 120 and abutting, at its inner end, shoulder 120a of this stud. Bushing 125 extends through hub 126 of a spur gear wheel 127 disposed adjacent the front face of bracket plate 73, the gear wheel being fixed to the hub for rotation therewith and the hub 126 and bushing 125 having relative rotation. Hub 126 is provided with a ratchet wheel 128 rigid therewith, this ratchet wheel conveniently being formed integral with the hub and disposed at the outer face of gear 127. A pawl 129, disposed at the outer face of gear 127, is secured upon a stud 130 extending through bracket plate 73 and provided with a shoulder 131 contacting the outer or front face of this plate. A spring washer 132, of known type, extends about the inner portion of stud 130 and is confined between the back or inner face of bracket plate 73 and a U-shaped locking member or key 133 engaging into a circumferential groove 134 provided adjacent the inner end of the stud. Pawl 129 is thus mounted for rocking movement on a horizontal axis, and spring washer 132 holds shoulder 131 of the stud in frictional contact with the front face of bracket plate 73 providing friction means for preventing movement of the pawl under the influence of gravity.

Ratchet 128 is provided with a suitable number, in this case six, of radial teeth 135 of stepped formation. Pawl 129 is provided, at its upper end, with a bill 136 which, in the normal position of the pawl shown in Figure 10, overlies gear 127 and engages in back of one of the teeth 135 so as to hold the ratchet wheel 128 and gear 127 against rotation in a clockwise direction. Gear 127 meshes with pinion 74, as shown in Figures 10 and 11. Pawl 129 is provided, at its lower end, with a forwardly projecting pin 137 disposed to be contacted by cam surfaces 138 and 139 of plate 113. When this plate is turned from its normal position shown in Figure 10 into its position shown in Figure 11, bill 136 of pawl 129 remains engaged with the tooth of ratchet wheel 128 until the plate 113 approaches the limit of its travel, at which time cam surface 138 contacts pin 137 so as to turn the pawl in a counterclockwise direction and move bill 136 thereof outward sufficiently to clear the teeth of the ratchet wheel, as shown in Figure 11. During movement of plate 113 in a counterclockwise direction, gear 127 and ratchet wheel 128 are held against turning movement with the plate by the resistance offered to such movement by the conveyor, which, as previously described, is driven by pinion 74.

An operating pawl is pivotally mounted at 141 on plate 113 at the inner or back face thereof and adjacent the end of the plate remote from the holding pawl 129. A tab 142 projects forward from pawl 141, through a notch 143 cut in the lower edge portion of plate 113, and the pawl is urged toward ratchet wheel 128 by a compression coil spring 144 confined between tab 142 and the remote end wall of notch 143, the tab and the end wall of the notch being provided with suitable studs about which the ends of the spring seat.

Pawl 140 engages in back of one of the teeth 135 of the ratchet wheel 128 and, in the normal position of the conveyor driving plate 113 occupies, the position shown in Figure 10. During movement of plate 113 from its position shown in Figure 10 to its position shown in Figure 11, pawl 140 travels around ratchet wheel 128 a distance slightly greater than the distance between two successive teeth 135 and, when plate 113 reaches its position shown in Figure 11 the pawl 140 is disposed in back of the next succeeding tooth of the ratchet wheel. During the return movement of plate 113 to its normal position, ratchet wheel 128 and gear 127 are turned in a clockwise direction, as viewed in Figure 11, through a distance corresponding to the spacing of teeth 135 of the ratchet wheel, that is, through one-sixth of a rotation. This serves to operate the conveyor so as to bring the next succeeding shelf thereof into position at the delivery station to replace the next preceding shelf, from which an article has been discharged during movement of plate 113 from its position shown in Figure 10 into its position shown in Figure 11. In this manner, the conveyor is intermittently operated so as to advance the shelves successively to the delivery station.

We provide means for selectively operating the control and operating mechanisms of the respective stacks. This means comprises a connecting rod 145 attached at its upper end to a stud 146 secured to plate 113 adjacent the pivot 141 of operating pawl 140. Any suitable or preferred connection may be provided between the connecting rod and the stud, but we prefer to provide an adjustable connection whereby the effective length of the connecting rod may be varied to compensate for any slight inaccuracies in manufacture and so as to assure accuracy in operation.

Figure 19:
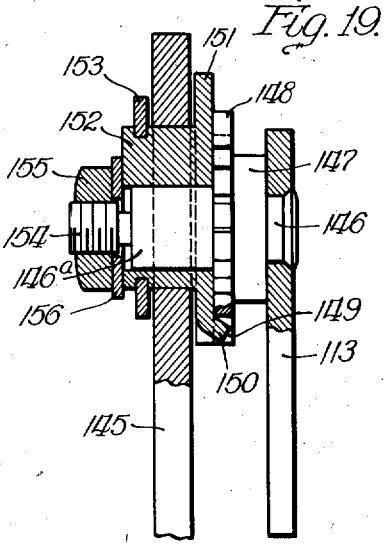
Figure 19 is a section taken substantially on line 19—19 of Figure 18, on an enlarged scale, showing the adjustable connection between the driving plate and connecting rod.
Figure 20:
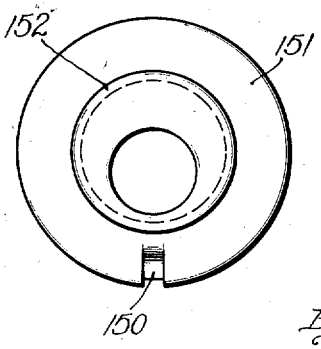
Figure 20 is a detail of the eccentric member for adjusting the connection of the connecting rod.

Referring to Figure 19, stud 146 is provided with a shoulder 147, and with a disc 148 at the outer face of this shoulder and secured to the stud in a suitable manner, conveniently by being formed integral therewith. Disc 148 is provided with a plurality of notches 149 adapted for reception of a cooperating tab 150 struck from flange 151 of an adjusting collar 152 concentric with flange 151, this collar being provided with an eccentric bore which rotatably receives intermediate portion 146*a* of stud 146. Collar 152 fits snugly through a corresponding opening in connecting rod 145, the upper end portion of this rod being confined between flange 151 and a locking member or key 153 of approximately U-shape which engages into a circumferential groove formed in collar 152 adjacent the forward end of the latter. The outer or forward end of stud 146 is reduced and threaded to provide a screw stud 154 upon which screws a nut 155 between which and collar 152 is disposed a lock washer 156 of known type. By threading nut 155 off of the screw stud 154 a suitable distance, tab 150 may be disengaged from the notch of disc 148 and, by turning collar 152, may be engaged selectively with notches 149 for effecting desired adjustment of the connection between this rod and stud 146.

Figure 24:
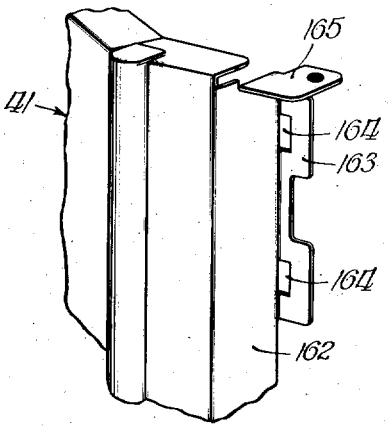
Figure 24 is a fragmentary detail perspective view of the portion of the casing at the left end of the keyboard.
Figure 25:
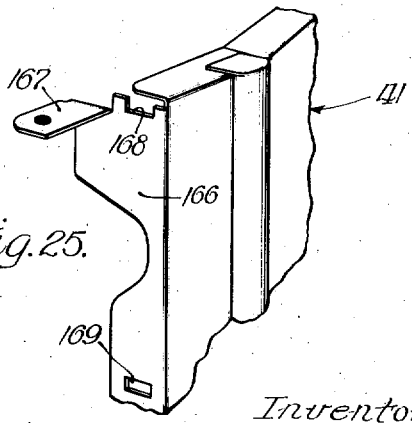
Figure 25 is a fragmentary perspective view of the portion of the casing at the right end of the keyboard.
Figure 26:
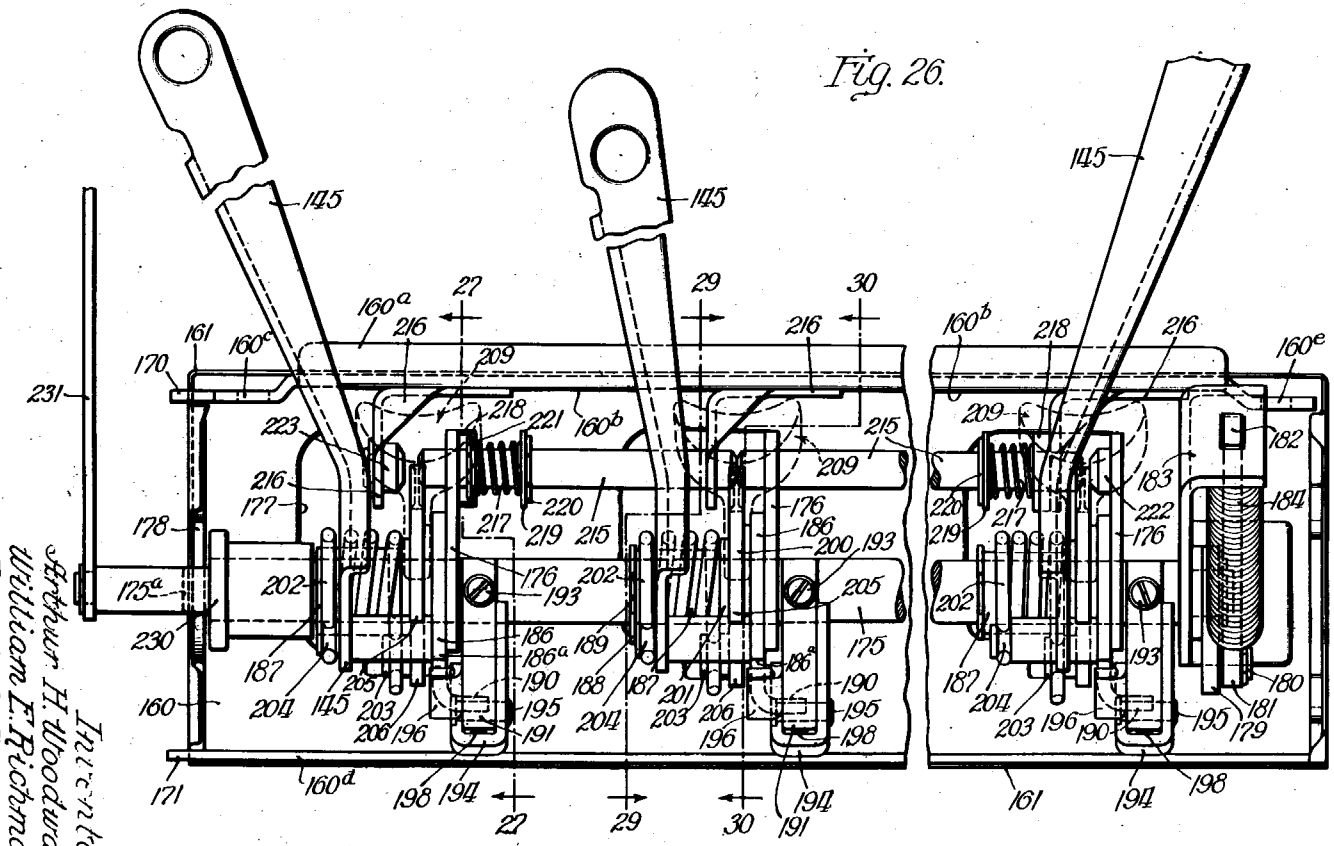
Figure 26 is a back view of the keyboard and associated parts, partly broken away.
Figure 31:
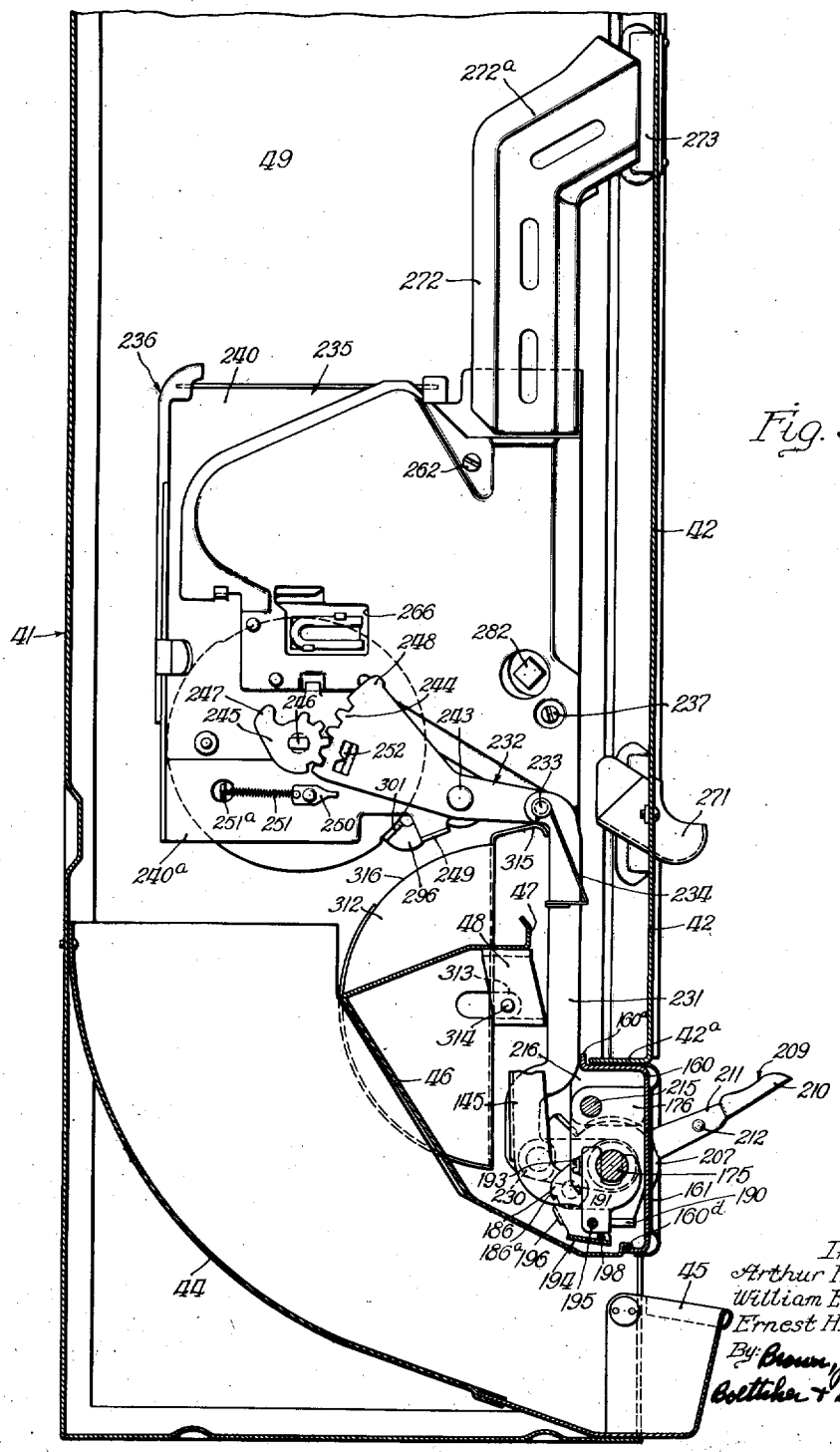
Figure 31 is a section taken substantially on line 31—31 of Figure 2, on an enlarged scale.
Figure 36:
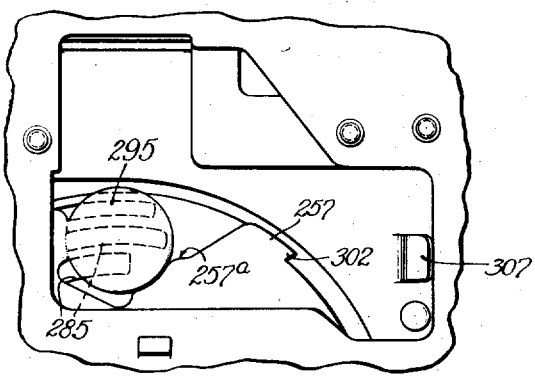
Figure 36 is a section taken substantially on line 36—36 of Figure 34.
Figure 37:
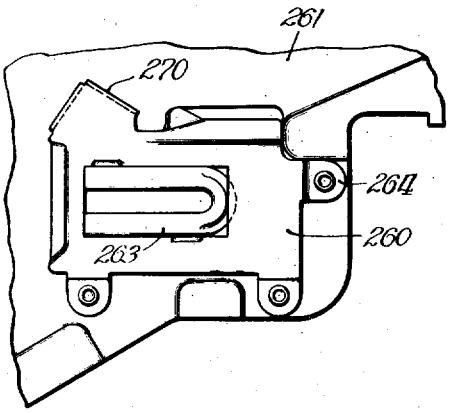
Figure 37 is a section taken substantially on line 37—37 of Figure 34.

The connecting rods 145 correspond in number to the stacks. Each of these rods is of angle cross-section for the major portion of its length (Figures 26 and 27) and is connected, at its lower end to main operating means of what we term "keyboard" type, which operating means is supported by a keyboard 160 of channel cross-section disposed immediately below door 42 and above trough 45. Preferably, the top flange of keyboard 160 is provided, at its upper edge, with a vertical flange 160*a* which projects upward beyond bottom flange 42*a* of door 42 (Fig. 31) so as to prevent insertion of an instrument between the keyboard and the bottom flange of the door beyond the inner edge of the latter for springing or forcing the door open. An ornamental cover plate 161 is disposed over the front face of keyboard 160 and secured thereto in a suitable manner, conveniently by bending portions of this plate about the ends of the keyboard. Casing 41 is provided, immediately below door 42, with an opening corresponding in length to the keyboard 160. At the lefthand side of this opening the casing is provided with a rearwardly projecting flange 162 (Figure 24) from the rearward edge of which projects an elongated tab 163 which extends parallel with the keyboard. This tab is provided with two spaced openings 164 and flange 162 is further provided, at its upper end, with a tab 165 disposed above tab 163 and extending at right angles to flange 162. Tab 165 is provided with an opening conveniently formed by spinning the metal of this tab to produce a short collar which is interiorly threaded for reception of a securing screw. The casing is also provided, at the righthand end of the keyboard opening, with a rearwardly projecting flange 166 from the upper end of which extends a tab 167 aligned with tab 165 and, like the latter tab, provided with an interiorly threaded collar. Flange 166 is provided, in its upper edge, with a notch 168 and, at a suitable distance below this notch, with a slot 169. The end portions of top flange 160*b* of the keyboard are offset downward at 160*c*, as shown in Figure 26. Flange 160*b* is provided, at the righthand end thereof, with a finger 170 which projects beyond the end of the keyboard and is vertically aligned with a similar finger 171 which projects from the lower flange 160*d* of the keyboard. Fingers 170 and 171 are disposed to engage into notch 168 and slot 169, respectively, of flange 166, when the keyboard is mounted in the casing. At its lefthand end the keyboard is provided with two rearwardly projecting hooks 172 (Figure 21) disposed to engage through the openings or slots 164 of tab 163, as the keyboard is placed in position, the bills of these hooks engaging behind tab 163 upon slight downward movement of the keyboard in the final positioning thereof. When the keyboard is properly positioned, end portions 160*c* of top flange 160*b* seat upon the tabs 165 and 167 to which they are secured by screws. In this manner the keyboard is effectively secured in the casing, but may be removed and replaced with expedition and facility, as required. Bottom flange 160*d* of the keyboard engages beneath the forward lower edge of hopper plate 46, as shown in Figure 31, and prevents access to the operating and control mechanisms by displacing this plate.

A main operating shaft 175 (Figure 26) is mounted for turning movement in brackets 176 conveniently formed integral with the keyboard, by appropriately slotting the latter and bending the bracket thus defined rearward of the keyboard at right angles thereto, the resulting openings 177 in the keyboard being closed by the cover plate 161. The keyboard is further provided, at the righthand end thereof, with a rearwardly projecting bracket 178 in which is rotatably mounted the reduced right end portion 175*a* of shaft 175. The lefthand end portion of shaft 175 is squared at 175*b* (Figure 21) and has suitably secured thereon a radially extending arm 179. The outer end of this arm is pivotally connected, by a pin 180, to head 181 at the lower end of a flat rod 182 slidable through a corresponding opening in the upper arm of a bracket 183 of approximately elongated U-shape, this bracket being suitably secured to the keyboard and extending at an inclination upward and rearward therefrom. A coil compression spring 184, mounted about rod 182, is confined between the upper arm of bracket 183 and head 181 and yieldingly urges shaft 175 in a counterclockwise direction, as viewed in Figure 21. Movement of the shaft in this direction is limited by means to be hereinafter described, so that the shift is yieldingly held in normal position by spring 184, to which position the shaft is returned by the spring upon being released after being displaced from normal position.

Figure 27:
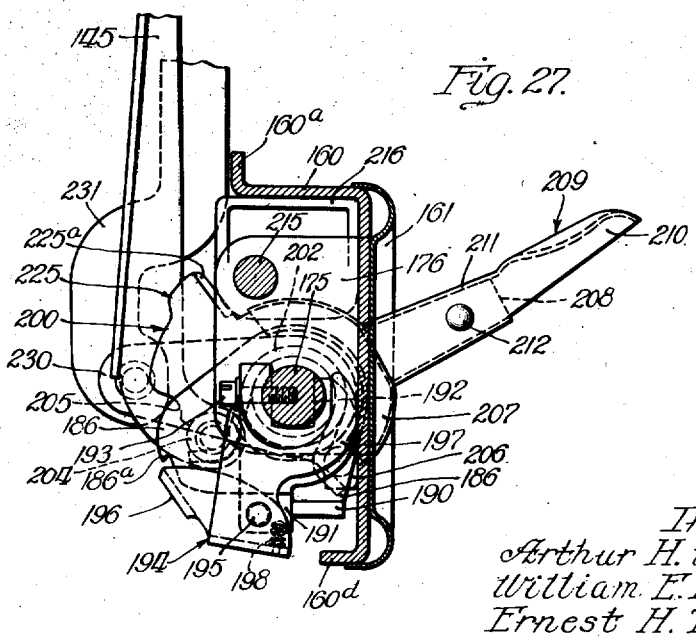
Figure 27 is a section taken substantially on line 27—27 of Figure 26, partly broken away and with the key in its normal raised position.
Figure 28:
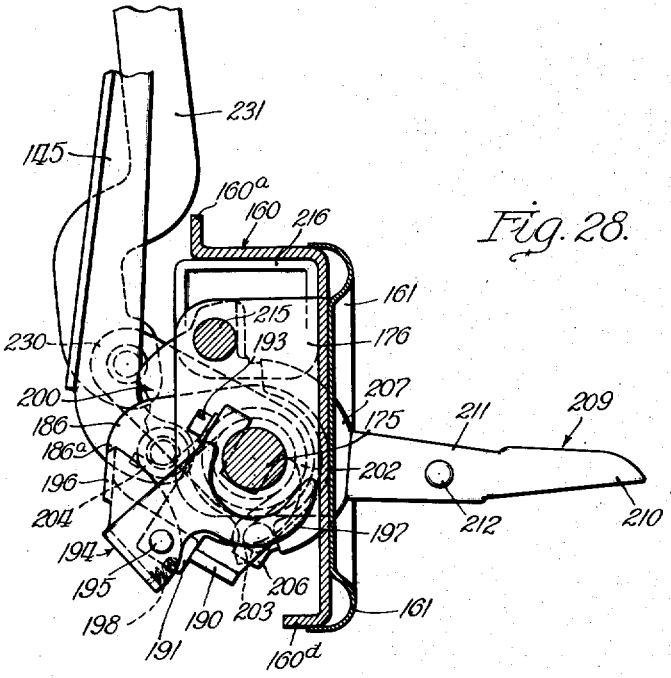
Figure 28 is a view similar to Figure 27 but with the key in operated or depressed position.

A latch plate 186 is disposed adjacent the righthand side of each of the brackets 176. This plate 186 comprises an elongated hub 187 mounted upon shaft 175 for relative turning movement, which hub is held against movement away from bracket 176 by a key 188 engaging into a circumferential groove 189 in shaft 175. Latch plate 186 and hub 187 thereof are thus confined between bracket 176 and key 188 so as to be held against lengthwise movement on the shaft 175. Plate 186 is provided, at its lower portion, with a finger 190 which projects toward the lefthand end of the keyboard and is disposed in front of the lower portion of an arm 191, as shown in Figure 27. The upper portion of this arm 191 is of approximately U-shape and fits snugly about a squared element 192 of shaft 175, to which it is secured by a screw 193. A pawl 194 of approximately U-shape in back view, is pivoted at 195 on the lower portion of arm 191. This pawl is provided with a detent 196 extending from one arm thereof toward the righthand end of the keyboard and overlying latch plate 186, the latter being provided with a notch 186a for engagement with the detent of the pawl. The other arm of the pawl is extended and shaped to provide a cam finger 197 which extends forward and upward about shaft 175. Pawl 194 is urged in a clockwise direction, as viewed in Figures 27 and 28, by a compression coil spring 198 confined between the pawl and the lower portion of arm 191, the upper portion of this spring seating in a suitable recess in the arm and the lower portion of the spring seating about a pin secured in the pawl. In the normal position of shaft 175 cam finger 197 contacts the inner face of keyboard 160 and holds the pawl 194 in its inoperative position, shown in Figure 27, in which position the pawl is out of engagement with latch plate 186. Upon turning movement of shaft 175 in a clockwise direction, as viewed in Figures 27 and 28, cam finger 197 is moved into position to release pawl 194, permitting engagement thereof with the latch plate, as shown in Figure 28, so that in the return movement of latch plate 186 to its normal position the shaft 175 will turn therewith, pawl 194 being released as the shaft and the cam plate reach their normal positions.

Figure 30:
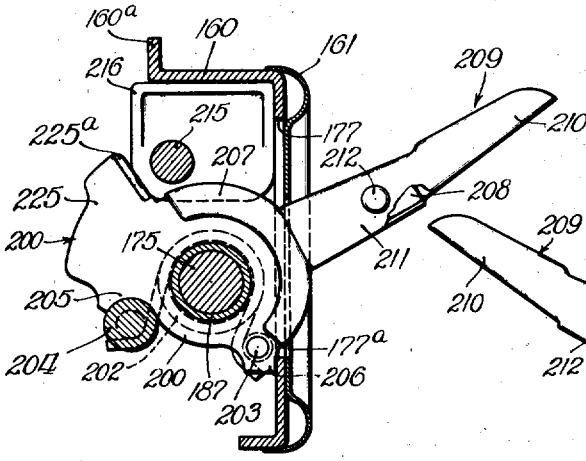
Figure 30 is a section taken substantially on line 30—30 of Figure 26.
Figure 29:
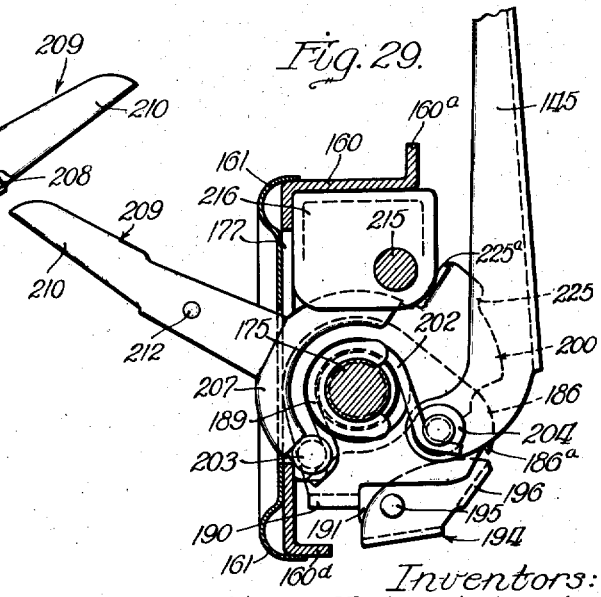
Figure 29 is a section taken substantially on line 29—29 of Figure 26.

A cam plate 200, shaped as shown in Figure 30, is mounted for relative turning movement upon hub 187 of each of the latch plates 186 and is confined between the latter plate and a flange 201 integral with hub 187. A coil spring 202 is mounted upon hub 187 at the righthand side of flange 201 thereof, and the end of this spring adjacent cam plate 200 engages over and in back of a stud 203 secured in the lower portion of cam plate 200 and projecting therefrom toward the righthand end of the keyboard, which stud is provided with a circumferential groove which receives the end portion of the spring. The other end of spring 202 engages about the lower forward portion of a stud 204 secured in the lower portion of plate 186 and projecting therefrom parallel to stud 203, stud 204 being also provided with a circumferential groove which receives the end portion of the spring. Spring 202 is maintained under torsion and tends to rotate latch plate 186 and cam plate 200 in opposite directions so as to maintain stud 204 in contact with shoulder 205 of cam plate 200. This latter plate is provided with a depending stop lug 206 disposed to contact the inner or back face of keyboard 160, in the normal position of plate 200, so as to limit turning movement of the latter in a counterclockwise direction, as viewed in Figure 30.

Cover plate 161 of the keyboard is provided with openings 177a aligned with openings 177, and the forward portion of cam plate 200 projects through these openings. The upper forward portion of this plate is preferably covered by a cap 207 of aluminum or other suitable noncorroding metal, and the plate is provided with a forwardly and upwardly projecting arm 208 conveniently formed integral with the plate and passing through cap 207. A key member 209, formed of aluminum or other suitable non-corroding metal, is secured upon arm 208, this key member comprising a head 210 and a shank 211 which fits snugly about arm 208 and is riveted thereto at 212. In the normal position of shaft 175, the key 209 is disposed at a forward and upward inclination as shown in Figure 30. The connecting rods 145 are pivoted at their lower ends upon the studs 204.

When one of the keys 209 is depressed, latch plate 186 is caused to turn with cam plate 200, due to the connection between these plates through spring 202. This imparts upward movement to the connecting rod 145, thus turning the conveyor driving plate 113 of the corresponding stack mechanism in proper direction and through a proper distance to cause delivery of an article from the stack. In this movement of the key, shaft 175 will be caused to turn with the key, due to contact of finger 190 of latch plate 186 with the forward edge of the depending portion of arm 191 rigidly secured to shaft 175. This places spring 184 under compression and, when the key is released, the expansive force of spring 184 acts to return shaft 175 to normal position and to return the key to its normal position, the latch plate 186 being also returned to normal position so as to move the connecting rod 145 downward into its normal position. During this downward movement of the connecting rod, conveyor driving plate 113 of the stack is returned to normal position and acts, during this operation, to advance the conveyor one step while returning the shelf holding bar and the trip lever and the locking plate to their normal positions. In the event that the shelf of the stack at the delivery station thereof is empty, locking plate 109 will remain in its operative position shown in Figure 12, thus preventing appreciable movement of driving plate 113 from its normal position. In this case, the connecting rod 145 cannot move upward to any appreciable extent, and the spring 202 provides a yielding connection between cam plate 200 and latch plate 186, effective to prevent damage to the mechanism due to forcing down of the key without corresponding operation of the associated connecting rod 145. Under these conditions, when the key is forced down, cam plate 200 turns on hub 187 of latch plate 186, the latter remaining stationary, or substantially so, and no turning movement is imparted to shaft 175.

We provide means for locking the remainder of the keys against operation when one of the keys is being operated. A plurality of locking bars 215 (Figure 26) are slidably mounted through brackets 176 and angle brackets 216 secured to the top flange of keyboard 160. The locking bars 215 are disposed coaxially and normally are maintained in endwise contact by compression coil springs 217 mounted about the outer end portions of the two end bars 215. One of these springs is confined between a cup washer 218 which abuts the inner side of bracket 176 adjacent the righthand end of the keyboard, and a washer 219 held against movement along the rod away from bracket 176 by a key 220 which engages into a circumferential groove in the rod. A key 221, engaging into a circumferential groove in the rod, is disposed within cup washer 218 and normally contacts the outer face thereof. It will be seen that spring 217 yieldingly urges rod 215 lengthwise away from bracket 176 while permitting movement of this rod toward the bracket to an extent limited by contact of key 221 with the inner face of the bracket. The other end rod 215 is urged inward in the same manner, but cup washer 218 contacts the inner face of the lefthand one of the brackets 216. A stud 222 is secured in the lefthand bracket 176 coaxially with the locking rods 215. The inner end of this stud, and the ends of the rods 215 are beveled as shown in Figure 26, and a stud 223, similar to stud 222, is secured to the righthand bracket 216 coaxially with the rods 215. It will be noted that the studs 222 and 223 are spaced a short distance from the outer ends of the end rods 215, and that the beveled inner ends of these rods are normally held in contacting relation. The number of locking rods is one less than the number of operating keys, it being noted that in Figure 26 three keys and two locking rods are shown. In the particular machine illustrated by way of example, there are five operating keys, as shown in Figures 1 and 2, the locking rods 215 being four in number and normally held in endwise contact as in Figure 26.

Each of the cam plates 200 is provided, at its upper rearward portion, with a shoulder 225, the forward edge of which is beveled from opposite sides to provide a wedging cam element 225a adapted to engage between the ends of two adjacent locking rods 215, this element normally being in the plane of the converging or V-shaped annular depression or trough defined by the abutting beveled ends of the locking rods. The two end cam plates 200 are disposed with their cam elements 225a in alignment with the spaces between the studs 222 and 223 and the outer ends of the adjacent locking rods. Upon key 209 being depressed, cam plate 200 is moved from the position shown in Figure 30 into that shown in Figure 28. During this movement of the cam plate, cam element 225a thereof enters between the adjacent ends of the locking rods 215, or between one of the studs 223 or 222 and the adjacent end of the locking rods, after which the body portion of the cam plate enters between the locking rods or the locking rod and the stud, as the case may be. This serves to shift the locking rods lengthwise into such positions as to lock the remaining keys against effective downward movement during operation of the selected key. Further, the latch plate 186 of the key being operated is latched to the operating shaft in such manner as to assure return of this shaft to normal position in the return movement of the key, as previously described. In this manner we assure that but one key can be operated for each movement of the shaft 175 from and to normal position. This eliminates possibility of obtaining a plurality of articles from the machine by depressing one of the keys and then jamming shaft 175 so as to prevent return movement thereof, and thereafter releasing the key first operated and again operating this key or others of the keys while the main operating shaft is held against return movement.

In addition to providing means responsive to the weight of the articles to be dispensed for controlling operation of the shaft 175, we also provide coin controlled means connected to this shaft and controlling operation thereof. A crank 230 is secured to the righthand end of shaft 175 for turning movement therewith. This crank is connected by a link 231 (Figure 31) to the forward end of an operating lever 232 of a coin controlled mechanism. Conveniently, the upper end of link 231 is pivoted to lever 232 by means of a stud 233 secured to the end of the lever and extending through the upper end of the link, the inner end of this stud having a circumferential groove which receives the upper end portion of a key or locking member 234, in the form of a suitable length of wire, which is loosely secured about link 231. By disengaging member 234 from stud 233, the link 231 may be withdrawn from the stud permitting of independent removal and replacement of the keyboard, and the coin controlled mechanism.

The coin controlled mechanism, designated in its entirety by the reference number 235, is demountably supported by a bracket 236 secured to the right side wall of casing 41, and is removably secured in position by a screw 237 which threads into a boss 238 secured to the adjacent side wall of the casing. By disconnecting link 231 and removing screw 237, the coin controlled mechanism can be removed as a unit with expedition and facility. This mechanism may be supported for ready removal and replacement in any suitable manner, and the particular supporting means employed need not be illustrated nor described in greater detail. Suffice it to note that suitable means is provided for removably supporting the coin controlled mechanism.

Referring to Figures 32 and 33, the coin controlled mechanism comprises a main plate 240 of substantially rectangular shape, this plate being provided at its upper and rearward edges with outwardly projecting flanges 241 and 242, respectively, which impart desired rigidity to the plate and also cooperate with the supporting bracket 236. Lever 232 is pivoted on a stud 243, suitably secured to plate 240a mounted upon the inner face of plate 240 at the lower portion thereof. The rearward portion of this lever is shaped to provide a gear segment 244 which meshes with a mutilated pinion 245 secured upon a stub shaft 246. Pinion 245 is provided with a finger 247 which contacts element 248 of lever 232 in the return movement of the latter after shaft 175 has been actuated by one of the keys and released.

Figure 39:
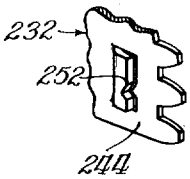
Figure 39 is a fragmentary detail perspective view of the operating lever of the coin control mechanism.

This permits of lever 232 being turned in a counterclockwise direction, as viewed in Figure 31, to a greater extent than that required for the desired rotation of shaft 246, while assuring proper meshing of segment 244 with pinion 245 in the return movement of the lever 232 to its normal position. Movement of lever 232 out of its normal position, that is, in a counterclockwise direction, is limited by a tab 249 projecting inward from plate 240*a* adjacent the lower edge thereof. A full throw pawl 250 is pivoted upon plate 240*a* below pinion 245. An over-center tension spring 251 is anchored at one end to the pawl and has its other end anchored to a tab 251*a* projecting inward from the plate 240. Pawl 250 cooperates with a notched projection 252 (Figure 39) pressed outward from lever 232. The pawl and the projection 252 cooperate to assure full throw of the lever 232 in each direction, in a manner well understood in the art and which need not be described in detail. Plate 240*a* is provided with suitable openings which accommodate tab 251*a* and the pivot mounting for the pawl 250, as shown in Figure 31.

Figure 34:
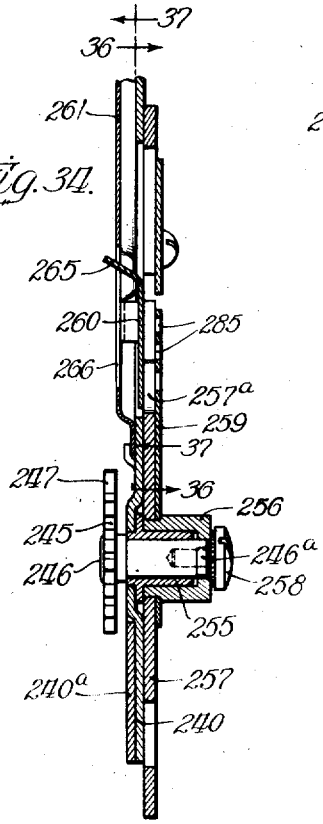
Figure 34 is a section taken substantially on line 34—34 of Figure 32.
Figure 35:
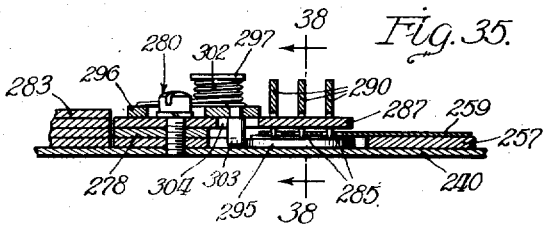
Figure 35 is a section taken substantially on line 35—35 of Figure 33.

Stub shaft 246 is rotatably mounted in a bearing sleeve 255 secured in plate 240 and projecting outward therefrom. The outer end portion of the stub shaft is of flattened or non-circular shape at 246*a* (Figure 34) and fits snugly into a corresponding opening in a cup-shaped hub 256 rotatably mounted upon sleeve 255. Hub 256 is secured to a coin receiving disc 257 centrally thereof and projects from the outer face of this disc. The hub is secured to stub shaft 246 by a screw 258 threading into the outer end of the stub shaft, a lock washer of known type preferably being disposed between the head of this screw and the end of the hub. In this manner pinion 245 and disc 257 are connected together for simultaneous and similar rotation.

Disc 257 is disposed at the outer face of plate 240 and projects beyond the lower edge of the latter. The coin receiving disc is provided with a coin receiving recess 257*a* extending from its periphery and of suitable size and shape for reception of the coin for which the mechanism is adapted. Recess 257*a* is closed at one side by an approximately semi-circular plate 259 suitably secured to the outer face of disc 257. The other or inner side of recess 257*a* is closed by a brass plate 260 disposed at the outer face of a cover plate 261 disposed at the inner face of plate 240. The plate 261 is offset from plate 240 for the major portion of its area, being provided with a suitably shaped peripheral flange which engages into suitable clips struck from plate 240, a securing screw 262 passing through this flange and threading into the main plate for releasably securing the cover plate in position. Brass plate 260 carries, at its inner face, a permanent magnet 263, of known type, mounted upon plate 260 in a suitable manner, conveniently by means of tabs struck from the latter plate. Plate 260 is provided with suitably disposed tabs 264 which are riveted or otherwise suitably secured to plate 261. The upper portion of plate 260 is bent inward at an angle, at 265, and serves, in the normal position of disc 257, to direct a descending coin into recess 257*a* of the disc. Plate 261 is provided with an opening 266 which accommodates magnet 263 and portions of plate 260, as shown in Figure 31.

Referring to Figure 32, the offset portion of plate 261 defines, with the inner face of plate 240, a short vertical coin chute 267 disposed at the upper forward corner of plate 240, a short downwardly and forwardly inclined coin return chute 268 disposed at the lower forward corner of plate 240, and a triangular space 269 into which the two chutes open. The upper portion 269*a* of space 269 is of approximately inverted V-shape, and the vertex thereof is in approximate alignment with a V-shaped element 270 extending from the upper forward corner of the magnet supporting plate 269. Chute 268 is disposed in alignment with a coin return cup 271 carried by and extending through door 42, when the latter is closed, the inner end portion of this cup being flared for reception of a coin delivered thereto. The bottom wall of cup 271 is disposed in alignment with bottom wall 268*a* of chute 268, it being understood that a coin rolls along wall 268*a* and thence into cup 271.

A coin receiving chute 272 is secured to the upper forward corner of plate 240, at the inner face thereof, and has its upper portion 272*a* disposed at an upward and forward inclination and extended into a pocket 273 formed in door 42 of the casing. The upper end of chute 272 is flared, as shown in Figure 2, and is disposed in alignment with a coin slot 274*a* (Figure 1) in a hardened steel plate 274 spot-welded to the door 42, when the latter is in closed position. The door is also provided with a slot in register with slot 274*a*, the length of the latter corresponding to the diameter of a coin of proper value for insertion into the machine, and preventing the insertion of coins or the like of greater diameter than that of the required coin.

Plate 240 is provided with an opening 275 which approximates Z-shape, one end portion of this opening extending above the central portion of disc 257 and the other end portion thereof extending forward of the upper portion of the disc. A frame 276 is secured to the outer face of plate 240 and extends about the forward portion of opening 275, this frame being provided at its upper rearward end with an offset element 276*a* which overlies the upper portion of opening 275 and defines an opening 277. A plate 278 is suitably secured, as by means of screws 279 and 280, to the outer face of frame 276, this plate extending about the upper forward portion of disc 257 in proximity to the periphery thereof. The frame 276 and plate 278 thus define the passage 277 leading from space 269 of cover plate 261 to the coin receiving recess of the disc 257, and a second passage 281 leading from the upper forward portion of disc 257 into space 269 a short distance above downwardly and forwardly inclined bottom wall 268*a* of plate 261. The magnet supporting plate 260 is disposed in the plane of opening 275 and serves to separate the passages 277 and 281. A bouncing block 282 is secured to a laminated plate 283 suitably secured to the outer face of plate 240 and disposed between flange 242*a* at the forward edge thereof and the forward edge of frame 276. The bouncing block extends through an opening in plate 240 and projects across the space between this plate and cover plate 261, being disposed in the path of a coin passing downward through chute 272 and chute 267. The upper face of the block is slightly inclined, as shown, this block being formed of hardened steel or other suitable metal. The bouncing block serves as a coin detector, in a known manner. If the proper coin is inserted, this coin rebounds from the bouncing block 282 to such an extent as to pass upward and rearward into space 269, from which latter space it passes through the passage 277 and thence is directed, by plate 260, into the coin recess 257a of disc 257. If the coin or article inserted is not of the proper metal and has less elasticity than that of the required coin, it will not rebound sufficiently from block 282 to enter the upper portion of space 269 and will, therefore, fall upon the lower inclined wall 268a of plate 261, being thereby returned to the coin return cup 271.

Figure 38:
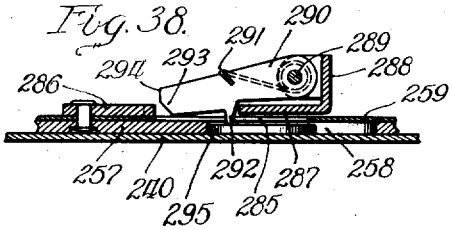
Figure 38 is a section taken substantially on line 38—38 of Figure 35.

Plate 259 is provided with three concentric slots 285 which overlie the coin recess 257a of disc 257. A block 286 is secured to the outer face of plate 259 and disc 257, immediately in rear of the slots 285, the forward end of this block being stepped as shown. The forward edge 258a of the coin recess 257a is considerably longer than, and inclined relatively to, the rearward edge of this recess. A bracket plate 287 is secured to frame 276 and plate 278, at the outer face of the latter, the rear end portion of this bracket plate 287 projecting across the forward portion of disc 257 below the center thereof. At its rearward end the plate 287 is provided with an integral U-shaped bracket 288 in the arms of which is mounted a pivot pin 289, upon which are rockably mounted three pawls 290 yieldingly urged toward the disc by coil tension springs 291 mounted about pin 289 and engaging the pawls and the bight portion of bracket 288. Each of the pawls 290 is provided, adjacent the upper edge of bracket plate 287, with a finger 292 which projects inward from the pawl and normally contacts plate 259. The upper end of the pawl is provided with an inclined edge 293 from which extends a straight edge 294 substantially perpendicular to the disc 257. The pawls 290 are so disposed that fingers 292 thereof will enter slots 285 upon rotation of disc 257 in a counterclockwise direction, as viewed in Figure 32, through a proper distance to bring these slots beneath the pawls. Assuming that the proper coin, designated by the reference number 295, has been inserted and reposes in coin receiving recess 257a of disc 257, when the disc has been turned into such direction that fingers 292 of pawls 290 pass through slots 285, the pawls will be held by coin 295 in substantially the position shown in Figure 38. In this position of the pawls, in the continued rotation of disc 257, the inclined or beveled edges 293 of the pawls will successively contact the steps of blocks 286 and the pawls will be raised sufficiently to permit of the block passing beneath them and, accordingly, will not interfere with turning of the disc. On the other hand, if the coin inserted is thinner than the coin required, the pawls will not be moved away from the disc sufficiently to assure movement of the straight edges 294 of the pawls beyond the plane of block 286, with the result that these straight edges of the pawls will contact the steps of the block and thus hold the disc against further rotation. In the event a slug or like article with a central opening is inserted, the finger of one or more of the pawls will engage into the opening, the pawl will not be raised and will engage block 286 stopping rotation of the disc 257. In this manner, the pawls 290 cooperate with the block 286 to prevent rotation of disc 257 sufficiently to permit of effective operation of the main operating mechanism, in the event the coin or article inserted is appreciably thinner than the required coin, or if the inserted article has an opening therein.

A locking pawl 296 is pivoted at its upper end on a stud 297, secured in the lower end of a supporting and adjusting bar 298 which is pivoted by stud 300 to plate 278 above and adjacent bracket plate 287. The upper end of bar 298 is attached, by screw and slot connections 299, to plate 278. Pawl 296 is provided, at its lower end, with a detent 301 disposed to contact the periphery of disc 257, and is urged toward the disc by a torsion coil spring 302 disposed about stud 297, one arm of this spring engaging over the edge of the pawl and the other arm of this spring engaging about stud 300. In the normal position of pawl 296, shown in Figure 32, detent 301 thereof contacts the edge of disc 257 and is in the path of travel of a shoulder formed on the disc a short distance in advance of the coin receiving recess 257a. A pin 303 is secured in pawl 296 a short distance below stud 297 and projects from the pawl toward plate 240. Bracket plate 287 is provided with a circular opening 304 which accommodates pin 303 and is of proper diameter to permit of the pawl 296 moving through a considerable distance about the axis of stud 297. Plate 278 is provided, at the rearward edge thereof, with a recess 305 which accommodates pin 303 and permits adequate movement of the pawl, this pin projecting toward plate 240 across the edge of disc 257. If the coin 295 is of the proper thickness and the proper diameter, the edge of this coin contacts pin 303 slightly before the disc 257 reaches the position shown in Figure 33, and before the shoulder of the disc contacts detent 301 of pawl 296, swinging the pawl in a clockwise direction so as to move detent 301 out of the path of the shoulder, permitting the disc 257 to turn slightly beyond the position shown in Figure 33. On the other hand, if the coin is of proper thickness, but is of slightly less than the required diameter, pawl 296 will not be moved into inoperative position and will serve to prevent rotation of disc 257 into full coin discharging position.

Assuming that the disc 257 has not been turned into full coin discharging position, thus preventing effective operation of the main operating mechanism, upon release of the shaft 175 it will be returned to normal position and the disc 257 will be turned in a clockwise direction into normal position. In the return movement of the disc, the coin, which tends to roll by gravity along the inclined edge 258a of coin recess 257a toward the rear edge of frame 276, will be caused to move upward along this frame to the passage 281. As the coin is moved upward along this passage, it will be deflected away from plate 278 by an inclined boss 307 projecting from the inner face of this plate. The coin is thus discharged through passage 281 and falls upon the inclined lower walls 268a of plate 261, whereby it is delivered to the return cup 271. The magnet 263 is disposed in the path of coins passing to the coin recess 257a of disc 257 and will act to retain magnetic articles, such as steel or iron slugs which may be inserted into the machine. Any article retained by the magnet will be engaged by the rear wall of recess 257a of disc 257, in the rotation of the latter, and will be pushed from the forward end of the magnet through passage 281, such articles being returned in the same manner as the rejected coins.

We have thus provided effective means for rejecting and returning coins of improper value or spurious coins or other articles of like nature. When a proper coin is inserted into the machine, disc 257 will be rotated to its full operative distance, upon pressing one of the keys, thus permitting effective operation of the dispensing mechanisms. Turning movement of the disc 257 in either direction is limited by a cylindrical stud 310 suitably secured to plate 240 at the outer face thereof, this stud projecting into a slot 311 provided in disc 257 concentric therewith. The length of slot 311 is such that one end wall thereof contacts stud 310 when the disc is in its normal coin receiving position, the other end wall of this slot contacting stud 310 when the disc is in its full coin discharging position, slightly beyond the position shown in Figure 33.

A coin receptacle 312 (Figure 31) of approximately semi-circular shape in side view, is provided at each side with an integral tab 313 struck from the side wall of the receptacle at the mid-length thereof. These tabs receive a pivot pin 314 mounted in the arms of bracket 48. The forward wall of receptacle 312 contacts the rearward edge of the bight portion of bracket 48 so that the receptacle normally is retained in the position shown in Figure 31. The upper end portion of the forward wall of the receptacle is extended and bent to provide a tab 315 for convenience in swinging the receptacle downward and forward about the axis of pin 314 when the door 42 of the casing 41 is open. The rearward wall of the receptacle 312 terminates an appreciable distance from the top of the latter so that an opening 316 is provided adjacent and below the lower end of pawl 296, it being noted that the receptacle is of appreciable width (Figure 2) and extends to both sides of plate 240. Upon turning movement of the disc 257 into its full operative or coin discharging position, the coin is discharged from recess 257a downward between pawl 296 and plate 240, into the receptacle 312. When the door of the casing is open, the coins can readily be discharged from the coin receptacle by swinging the latter forward and downward about the axis of pin 314, in the manner above stated.

The connections between the coin controlled mechanism and the main operating shaft 175 serve effectively to prevent operation of this shaft to a sufficient extent to obtain delivery of an article from the machine unless the disc 257 of the coin mechanism has been turned into full coin discharging position. In this connection, it is pointed out that partial rotation only of the shaft 175 by depressing a key is necessary to turn the disc 257 from its normal position to its full coin discharge position, due to the fact that lever 232 of the coin mechanism may turn a considerable distance after gear segment 244 thereof has been moved out of mesh with pin 245. The operating mechanisms of the machine are thus both coin controlled and article controlled in such manner as to prevent delivery of an article if an improper or spurious coin or like article is inserted into the coin mechanism, while also preventing effective operation of the main operating mechanism in the event that the stack corresponding to the key operated or depressed is empty, the coin or like article in each instance being returned.

In the modified form of stack shown in Figures 40 to 43, inclusive, the stack 56a comprises front and back channel members 57a and 58a, respectively, connected by a plate 59a, the marginal portions of which are formed to provide opposed channel elements 60a extending from one face of the plate and suitably secured to the channel members. Guide strips 325 and 65a of L-shape in cross-section are secured to channel members 57a and 58a respectively adjacent the other face of plate 59a. The channel elements 60a define, with the flanges at one edge of channel members 57a and 58a, guideways for the upwardly moving runs of the chains 63, and strips 325, 65a define, with the flanges at the other edge of members 57a and 58a, guideways for the downwardly moving runs of the chains.

Figure 40:
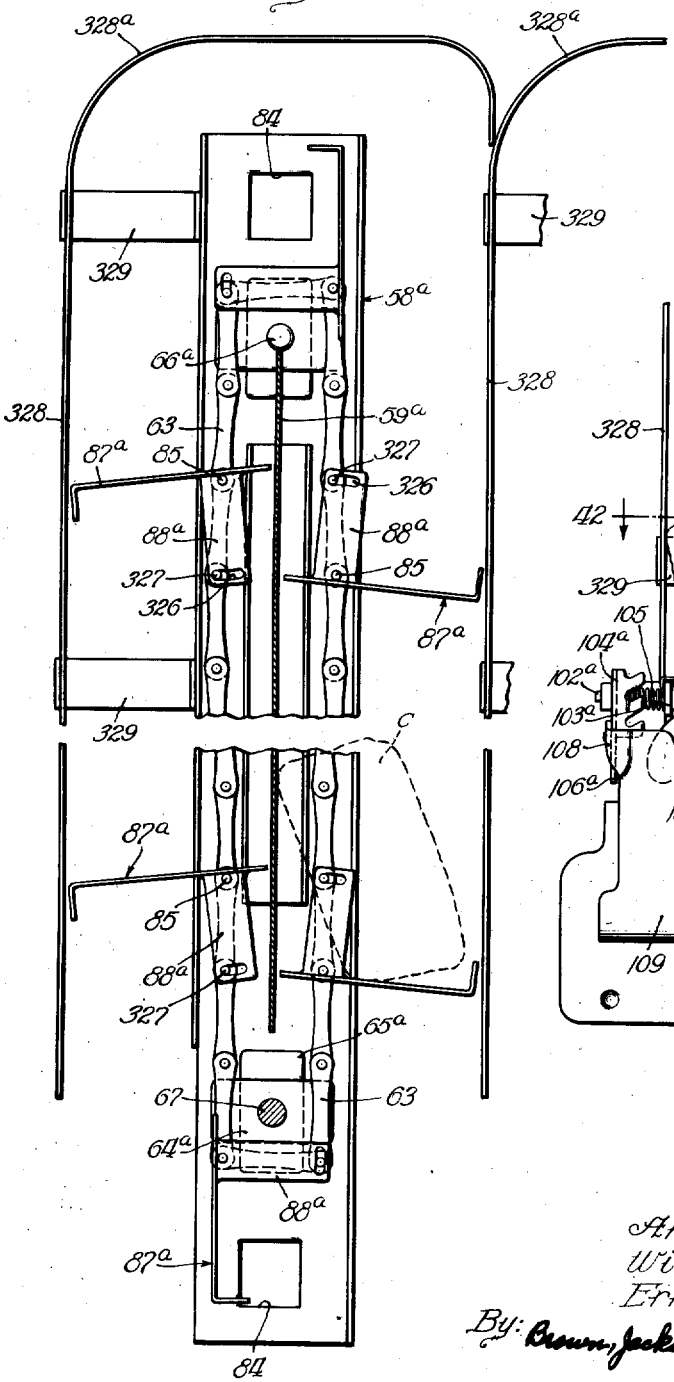
Figure 40 is a transverse vertical sectional view through a modified form of stack and associated parts, taken in a plane adjacent the front of the stack.
Figure 41:
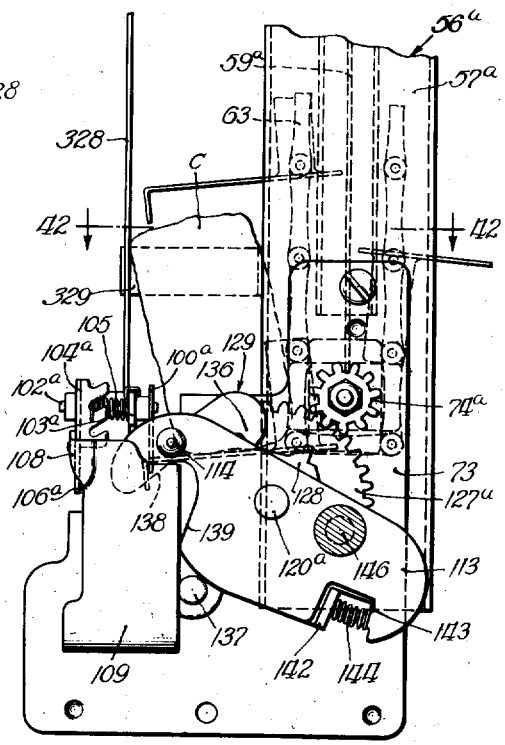
Figure 41 is a front view of the lower portion of the modified form of stack of Figure 40.
Figure 42:
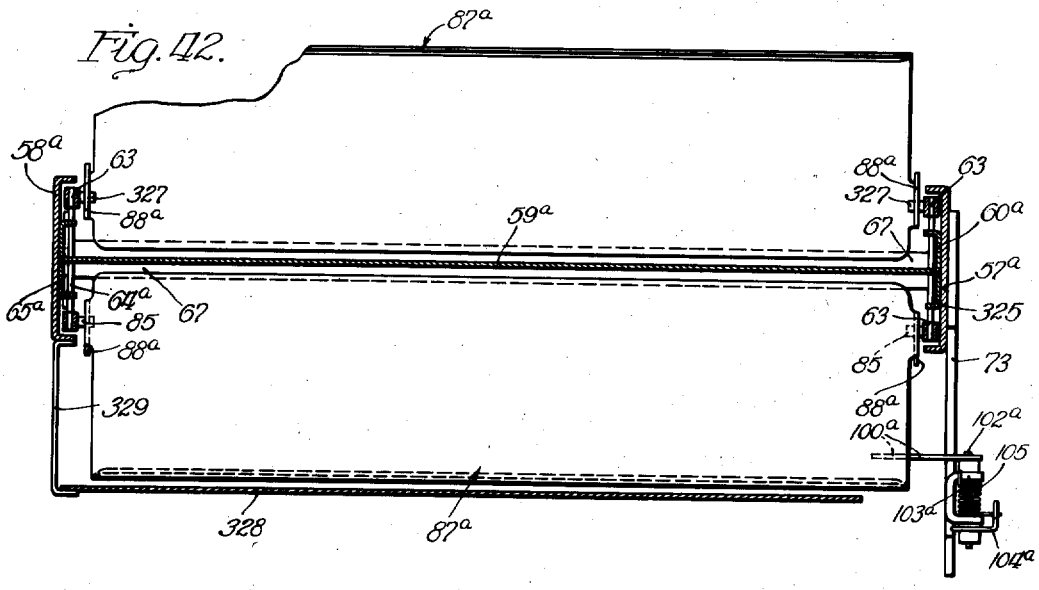
Figure 42 is a section taken substantially on line 42—42 of Figure 41.
Figure 43:
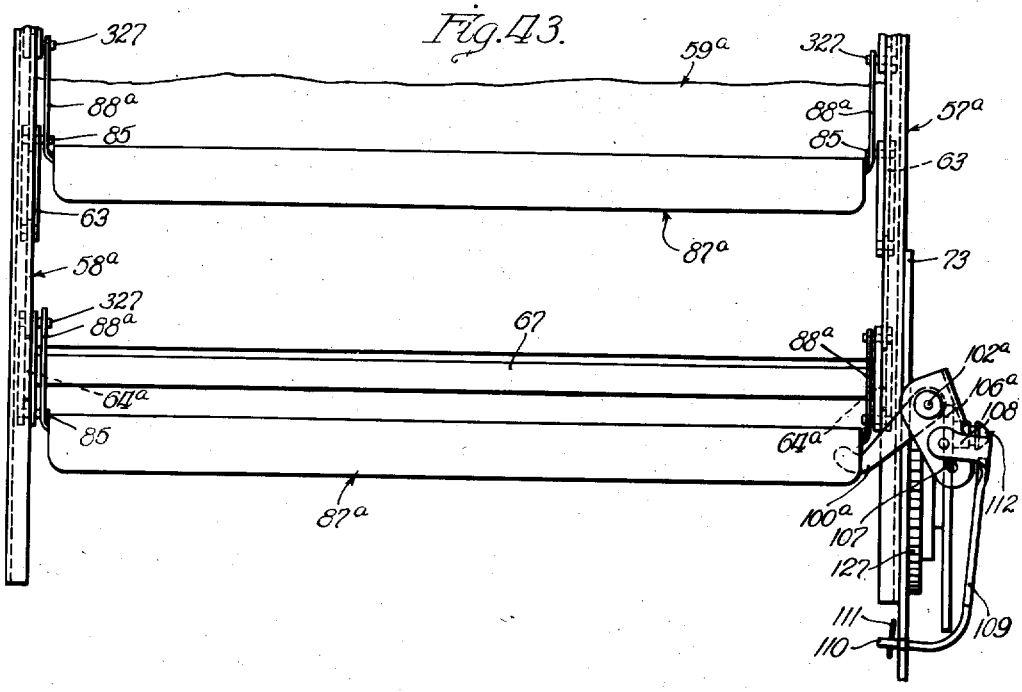
Figure 43 is a side view of the lower portion of the stack of Figure 41, with the article retaining plate omitted.
Figure 44:
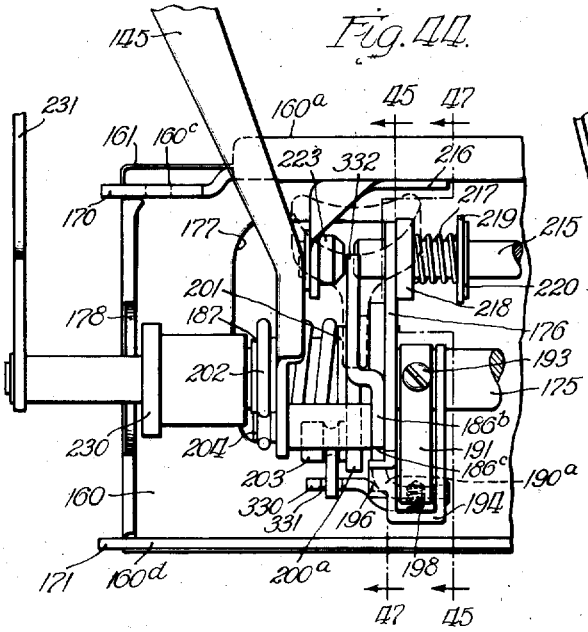
Figure 44 is a back view of the right end portion of a modified form of keyboard and associated mechanism.
Figure 45:
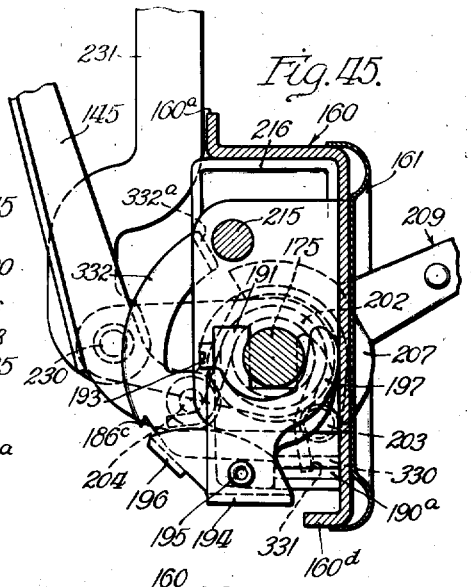
Figure 45 is a section taken substantially on line 45—45 of Figure 44, showing the parts of the operating mechanism in their normal positions, parts being shown in elevation.

The upper edge of plate 59a is disposed adjacent stub shafts 66a rotatably mounted in channel members 57a and 58a, upon which stub shafts the upper sprockets are secured, and the lower edge of this plate is spaced above shaft 67 upon which the lower sprockets are secured, the chains 63 being led over the sprockets in the manner previously described. Chains 63 carry article supporting shelves 87a of L-shape in cross-section, provided at each end and adjacent its inner edge with an elongated tab 88a disposed perpendicular to the shelf. These tabs 88a are pivotally connected to the chains, at points adjacent the shelf, by pins 85, which pins also serve as pivots connecting adjacent links of the chains. Tabs 88a are provided, adjacent the ends thereof remote from the shelf, with slots 326 concentric with pins 85, which slots receive pins 327, the latter also serving as pivots connecting the next adjacent links of the chains. It will be noted that tabs 88a correspond in length to the links of the chains, and that shelves 87a have limited turning movement relative to the chains 63, on pins 85, as shown in Figure 40.

Each stack 56a is provided, at the delivery side thereof, with an article retaining plate 328 supported in a suitable manner, conveniently by means of brackets 329 secured to channel member 58a, the upper portion of this plate being formed to provide a hood 328a extending over the upper end of the stack. This hood, though preferred, is not essential. The stacks are disposed within casing 41, with plate 328 of each stack in juxtaposition to the outer edges of the shelves on the upwardly moving run of the next adjacent stack, so as to be effective for retaining articles thereon, as in Figure 40. With respect to the last stack at the left side of the casing, the adjacent side wall of the casing may be utilized to retain the articles on the shelves of the downwardly moving run of the conveyor, in which case the retaining plate 328 may be omitted from this last stack.

The conveyor is operated in the manner previously described, by means of driving plate 113 and associated parts, it being noted, however, that the supporting bar 95 and cam plate 118 and associated actuating means are omitted. When a shelf 87a, with an article thereon, moves downward into position at the delivery station, it contacts trip arm 100a, secured on the inner end of pin 102a mounted for turning movement in tabs 103a of plate 73. An arm 106a, secured on the outer end of pin 102a, has a pin and slot connection 107 with arm 108 of locking plate 109, and is provided with a flange 104a having slots therein for reception of one end of a torsion spring 105 coiled about pin 102a, the other end of this spring engaging over tab 103a adjacent arm 100a. Spring 105 urges pin 102a in a clockwise direction, as viewed in Figure 43.

The weight of the article upon the shelf is sufficient to depress trip arm 100a, thus moving locking plate 109 into inoperative position, out of the path of travel of stud 114, in the manner previously described. At this time the lowermost shelf 87a at the downwardly moving side of the conveyor is at the delivery station, and occupies the dotted line position of Figure 41. When operating plate 113 is again actuated, it is first turned on its pivot 120a in a clockwise direction, as viewed in Figure 41, and when released is turned counter-clockwise until returned to its normal position. In this return movement of plate 113 the conveyor is advanced, the shelf at the delivery station depresses trip arm 100a further and then passes out of contact therewith. In the continued travel of the conveyor, the shelf moving from the delivery station is moved into vertical position, as in Figure 40, the article being discharged from the shelf during this travel thereof, and another shelf with an article thereon is advanced to the delivery station, the discharged shelf then being at the bottom of the upwardly moving side of the conveyor. In this manner, an article will be delivered from the stack upon each operation thereof, until the stack has been completely emptied, that is, so long as a shelf at the delivery station has thereon an article to be dispensed. The weight of a shelf 87a alone is insufficient to depress trip arm 100a. Consequently, when all of the articles have been delivered from a stack, an empty shelf is positioned at the delivery station, and locking plate 109 remains in operative position, preventing operation of the stack mechanism in the manner previously described.

The stack illustrated in Figures 40 to 43, inclusive, is capable of supporting an article upon each shelf, which has the advantage that a greater number of articles can be dispensed with a lesser number of these stacks than of the stacks previously illustrated and described herein. The spacing of the shelves 87a will depend upon the size of the articles to be dispensed, it being understood that in each instance the ratio of the gears 127a and 74a is such as to impart the appropriate extent of travel to the conveyor responsive to actuation of plate 113. The articles are inserted into the stack from the front thereof and, if desired, the brackets 329, which support plate 328, may be disposed between adjacent shelves to serve as stops for preventing insertion of the articles beyond the backs of the shelves.

The articles on the shelves at the upwardly moving run of the conveyor are inclined upward toward plate 59a, with which they are in contact at their upper inner corners, and stub shafts 66a are spaced apart sufficiently to clear the inner edges of the shelves. When the top shelf of the upwardly moving run approaches the top of the stack, the article thereon passes over and rests upon the upper edge of plate 59a. This shelf is then turned from its slightly downwardly inclined position into substantially vertical position, in its travel to the top sprockets, as shown in Figure 40, and during this turning movement of the shelf the article is slid therefrom across the upper edge of plate 59a and downward onto the top shelf of the downwardly moving run of the conveyor.

Referring to the modified form of keyboard mechanism illustrated in Figures 44 to 47, inclusive, plate 200a is mounted for relative turning movement on hub 187, and this plate is not provided with a cam element. Plate 186b is provided with a finger 190a extending in front of the lower portion of arm 191. A finger 330 is secured to finger 190a and projects therefrom below and parallel to stud 203 of plate 200a. Finger 330 is provided with a notch 331, in its rearward edge, which receives the end portion of spring 202, this end portion of the spring being extended rearward and downward beyond stud 203 as shown. The plate 186b is further provided with a cam finger 332 extending upward and forward therefrom concentrically with shaft 175, this finger being laterally offset from plate 186b and disposed in the plane of plate 200a. The upper end of finger 332 is shaped to provide a cam element 332a adapted for entry between the ends of locking bars 215, and plate 186b is provided, at the lower end of finger 332, with a notch 186c which cooperates with detent 196 of pawl 194 to assure that plate 186b and cam finger 332 can not be returned to their normal inoperative positions until shaft 175 has been returned to its normal position.

The spring 202 provides a yielding connection between plates 186b and 200a effective to prevent injury to the stack mechanism and associated parts by forcing a key down, as previously described. Plate 200a is of proper size to clear stud 204 of plate 186b, and has no projections in the path of movement of this stud, as shown in Figure 47, in which the key is shown as depressed and plate 186b is held against turning by contact of cam finger 332 with locking bar 215. It has been previously explained that the coin mechanism has associated therewith a full throw device which assures that a key must be fully depressed in order to deliver an article from the stack. In Figure 30 plate 200 is provided with a shoulder 205 disposed to contact the upper portion of stud 204 of plate 186. If a purchaser were to depress the key less than the full extent required, but sufficiently to render the full throw device effective to prevent return movement of the key, and then attempted to force the key up, considerable force would be exerted, through shoulder 205 and stud 204 and associated parts, on the shaft 175 and the stack mechanism. This might result in serious damage to either the stack mechanism or the full throw device, or both. This difficulty is avoided in the modified form of keyboard mechanism of Figures 44 to 47, inclusive, since plate 200a thereof has no projections in the path of movement of stud 204 of plate 186b, as above noted.

Figure 46:
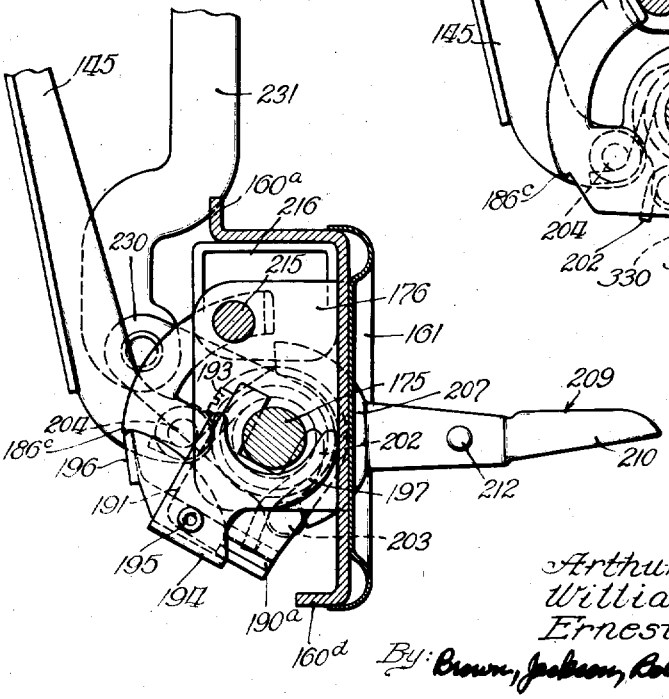
Figure 46 is a view similar to Figure 45, but with a key depressed in the normal operation of the keyboard mechanism.
Figure 47:
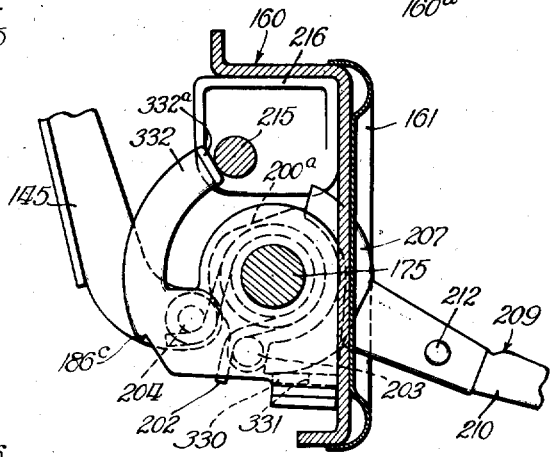
Figure 47 is a section taken substantially on line 47—47 of Figure 44, showing the positions of the parts of the keyboard mechanism when the main operating shaft is held against turning and a key is depressed, parts being shown in elevation.

If it be assumed that shaft 175, in Figure 46, has been turned clockwise to such an extent that the full throw device is effective to prevent return movement of the shaft, the key can be turned counter-clockwise into raised position without exerting any turning effect upon the shaft. This follows from the fact that plate 200a turns on hub 187 and has no projecting elements disposed to contact stud 204 or any projection of plate 186b. In the upward movement of the key, stud 203 is moved downward and forward from the end portion of spring 202, which remains in contact with finger 330, movement upward of the key being limited by contact thereof with the keyboard. This eliminates possibility of damage by forcing the key upward under the conditions referred to. This upward movement of the key does not affect the relative positions of the other parts of the keyboard mechanism. When the purchaser again moves the key downward to a greater extent than before, which would be the natural thing to do, shaft 175 is turned clockwise through the remainder of the required distance. Upon release of the key shaft 175 is turned counter-clockwise into its normal position, by means of spring 184, the stack mechanism is actuated and an article is delivered from the stack, as above described. In this return movement of shaft 175, plate 186b is returned to normal position, due to contact of finger 190a with arm 191, and acts, through stud 204, spring 202 and stud 203 to return plate 200a and key 209 thereof to their normal positions, the key then being in its raised position shown in Figure 45.

As above indicated, and as will be apparent to those skilled in the art, changes in construction and arrangement of parts of our invention may be resorted to, without departing from the field and scope of the same, and we intend to include all such variations, as fall within the scope of the appended claims, in this application in which the preferred forms only of our invention are disclosed.

What we claim is:

1. In a vending machine, an endless conveyor provided with article holding shelves pivoted for downward movement, means for intermittently operating the conveyor and successively advancing said shelves to a delivery station, means for holding the shelves projected outward from the conveyor and for releasing each shelf as it reaches said station, a support at said station normally disposed to support a shelf in projected position and movable out of operative position to release means and said support for moving the latter out the shelf, connections between said operating of and returning it to operative position upon full operation of said operating means, and locking means responsive to the weight of an article on the shelf at said station effective for permitting full operation of said operating means and preventing full operation thereof when the shelf is empty.

2. In a vending machine, a conveyor comprising shelves pivoted for downward movement, means for holding the shelves substantially horizontal and for releasing each shelf as it reaches a delivery station in the travel of the conveyor, a support at the delivery station normally disposed to limit downward movement of a released shelf, a driving plate, connections between said plate and said support for moving the latter into inoperative position when the plate is moved in one direction and returning it to operative position when said plate is moved in the opposite direction, connections between said plate and said conveyor for advancing the latter when the plate is moved in said opposite direction, locking means comprising an element carried by said plate and a cooperating stop member positionable to prevent movement of said plate in said one direction beyond a predetermined limited extent insufficient to release the shelf at said station, a trip lever connected to said stop member and yieldingly urged in a direction to hold said stop member in operative position, said trip lever projecting into the path of a shelf at said station and acting to move the stop member into inoperative position when actuated by the weight of an article on the shelf, and means for operating said plate.

3. In a vending machine, a conveyor comprising shelves pivoted for downward movement, means for holding the shelves substantially horizontal and for releasing each shelf as it reaches a delivery station in the travel of the conveyor, a support at the delivery station disposed to limit downward movement of a released shelf, a driving plate, means actuated by said plate for releasing the shelf at said station from said support and advancing the conveyor, locking means comprising an element carried by said plate and a cooperating stop member positionable to prevent effective movement of said plate, a trip lever connected to said stop member and yieldingly urged in a direction to hold said stop member in operative position, said trip lever projecting into the path of a shelf at said station and acting to move the stop member into inoperative position responsive to the weight of an article on the shelf, and means for operating said plate.

4. In a vending machine, a conveyor comprising shelves pivoted for downward movement, means for holding the shelves substantially horizontal and for releasing each shelf as it reaches a delivery station in the travel of the conveyor, a support at the delivery station disposed to limit downward movement of a released shelf, means for intermittently operating the conveyor and successively advancing said shelves to the delivery station and there releasing them from said support, and article controlled means responsive to an article on a shelf at said station for permitting effective operation of said operating means while preventing effective operation thereof when the shelf at said station is empty.

5. In a vending machine, a conveyor comprising shelves pivoted for downward movement and normally disposed substantially horizontal for supporting articles to be dispensed and successively advanced to a delivery station in the operation of the conveyor, means for operating the conveyor, article controlled means responsive to the weight of an article on a shelf at the delivery station for permitting effective operation of said operating means while preventing effective operation thereof when the shelf at said station is empty, and means for releasing a shelf for downward movement about its pivot axis and thereby discharging the article therefrom during such downward movement of the shelf.

6. In a vending machine, a conveyor comprising flexible members and shelves for supporting articles to be dispensed, said shelves being pivoted for downward movement, means normally holding said shelves substantially perpendicular to said members while permitting limited relative downward pivotal movement of the shelves, means for operating the conveyor and thereby successively advancing the shelves to a delivery station, and empty lock means responsive to the weight of an article on a shelf at the delivery station for permitting effective operation of said operating means while preventing effective operation thereof when the shelf at said station is empty, said empty lock means comprising a movable operating control member at the delivery station normally disposed beneath the shelf at said station in contact therewith, said member and the shelf being relatively movable out of contacting relation in the operation of the conveyor.

7. In a vending machine, a casing, a plurality of vertical stacks disposed within the casing in juxtaposed sidewise relation, each stack comprising an endless conveyor having an upwardly moving run and a downwardly moving run and comprising article receiving shelves pivoted to the conveyor for relative downward movement, means for intermittently operating the respective conveyors and successively advancing said shelves to a delivery station, means for holding the shelves at the downwardly moving side of the respective conveyors substantially horizontal and for releasing each shelf as it reaches the station, the arrangement being such that the shelves at the upwardly moving side of the conveyor are disposed substantially vertical and in over-lapping relation, means at the delivery station for holding the released shelf against downward movement, means actuated by said operating means upon full operation thereof for moving said holding means into inoperative position, and article controlled means permitting full operation of said operating means when there is an article upon the shelf at said station while preventing effective operation of said operating means when the shelf at said station is empty.

8. In a vending machine, a casing, a plurality of vertical stacks disposed within the casing in juxtaposed sidewise relation, each stack comprising an endless conveyor having an upwardly moving run and a downwardly moving run and comprising article receiving shelves pivoted to the conveyor for relative downward movement, means for holding the shelves at the downwardly moving side of the conveyor substantially horizontal during the major portion of their travel, the arrangement being such that the shelves at the upwardly moving side of the conveyor are disposed substantially vertical and in overlapping relation, means for intermittently operating the respective conveyors and successively advancing said shelves downward to a delivery station and there releasing them, and means responsive to the weight of an article on a shelf at said station for permitting operation of said operating means while preventing effective operation thereof when the shelf at said station is empty.

9. In a vending machine, a plurality of article containing and delivering mechanisms, an operating shaft yieldingly turned in one direction, full-stroke means effective for necessitating turning of said shaft a predetermined distance in either direction, operating keys yieldingly attached to said shaft for turning it in the opposite direction and having operating connections to the respective mechanisms, means for preventing operation of the remainder of the keys during operation of one thereof, means for locking the respective keys to said shaft in the return movement of the latter, and article controlled means for preventing full operation of a key when the corresponding containing and delivering mechanism is empty.

10. In a vending machine, a plurality of article containing and delivering mechanisms, an operating shaft yieldingly turned in one direction, full-stroke means effective for necessitating turning of said shaft a predetermined distance in either direction, latch plates loose on said shaft, abutment members fixed to said shaft and cooperating with said plates, operating keys comprising cams loose on said shaft and having yielding connection to the respective plates for turning said shaft in the opposite direction, operating connections between said plates and said mechanisms, means actuated by the cams for locking the remainder of the keys against operation during operation of one thereof, means for latching the respective plates to said shaft, in the return movement of the latter, and article controlled means for preventing full operation of a key when the corresponding one of said mechanisms is empty.

11. In a vending machine, a plurality of article containing and delivering mechanisms, an operating shaft yieldingly turned in one direction, full-stroke means effective for necessitating turning of said shaft a predetermined distance in either direction, latch plates loose on said shaft, abutment members fixed on said shaft and cooperating with said plates, operating keys comprising cams loose on said shaft and having yielding connection to the respective plates for turning said shaft in the opposite direction, operating connections between said plates and said mechanisms, means actuated by the cams for locking the remainder of the keys against operation during operation of one thereof, and means for latching the respective plates to said shaft in the return movement of the latter.

12. In a vending machine, a plurality of article containing and delivering mechanisms, an operating shaft yieldingly turned in one direction, full-stroke means effective for necessitating turning of said shaft a predetermined distance in either direction, pairs of adjacent plates loose on said shaft, the plates of each pair being yieldingly connected, abutment members fixed on said shaft adjacent said pairs of plates, one of the plates of each pair having an element disposed to contact the adjacent abutment member, keys secured to the other plate of the respective pairs for turning said shaft in the other direction, interlock means actuated by one plate of the respective pairs for locking the remainder of the keys against operation during operation of one thereof, and means for latching a plate of the respective pairs of plates to said shaft in the return movement of the latter.

13. In a vending machine, a plurality of article containing and delivering mechanisms, an operating shaft yieldingly turned in one direction, full-stroke means effective for necessitating turning of said shaft a predetermined distance in either direction, pairs of adjacent plates loose on said shaft, connections between said plates and said shaft comprising yielding means for turning said shaft in the opposite direction responsive to turning of one of said plates in said opposite direction, said connections permitting independent turning of said one plate in a reverse direction when said shaft has been turned in said opposite direction, keys secured to said one plate of said pairs of plates, interlock means for locking the remainder of the keys against effective operation during effective operation of one thereof, and means for latching the other plate of said pairs of plates to said shaft in the return movement of the latter.

14. In a vending machine, a plurality of article containing and delivery mechanisms, an operating shaft yieldingly turned in one direction, full-stroke means effective for necessitating turning of said shaft a predtermined distance in either direction, pairs of adjacent plates loose on said shaft, each pair comprising a key plate and a cam plate each provided with a stud projecting from one face thereof, abutment members fixed on said shaft adjacent said pairs of plates, said cam plate being provided with a stop finger contacting the adjacent abutment member and with a second finger disposed oppositely to said stop finger, a torsion spring disposed about said shaft with one end engaging the stud of the cam plate and its other end extending across the stud of the key plate and engaging said second finger of said cam plate, said spring and studs providing a yielding connection between said plates for turning said shaft in the opposite direction while permitting independent turning of said key plate in the direction in which said shaft is yieldingly urged, when said shaft has been turned in said opposite direction, keys secured to said key plates, interlock means actuated by said cam plates for locking the remainder of the keys against operation during operation of one thereof, and means for latching the respective cam plates to said shaft during return movement of the latter.

15. In a vending machine, a conveyor provided with article holding shelves pivoted to said conveyor for relative downward movement, means for intermittently operating the conveyor and successively advancing said shelves to a delivery station, and empty lock means controlled by the weight of articles on the respective shelves acting to permit effective operation of said operating means when there is an article upon the shelf at said station and to prevent effective operation of said operating means when the shelf at said station is empty, said empty lock means comprising a movable operating control member at the delivery station normally disposed beneath the shelf at said station in contact therewith, said member and the shelf being relatively movable out of contacting relation in the operation of the conveyor.

16. In a vending machine, a conveyor comprising a chain consisting of pairs of links alternating with single links, means for supporting said chain comprising a sprocket having rigidly connected radial projections alternately disposed in spaced parallel planes normal to the axis of the sprocket, those in one plane engaging between the links of the pairs of links, and those in the other plane taking positions adjacent the single links, article holding members carried by said conveyor, operating means for intermittently rotating said sprocket thereby operating the conveyor and successively advancing said article holding members to a delivery station, means for discharging an article from a holding member at said station, and means for completing effective operation of said operating means when the article holding member at said station contains an article to be dispensed and preventing effective operation thereof when the article holding member at said station is empty.

17. In a vending machine, an endless conveyor having an upwardly moving run and a downwardly moving run, said conveyor being provided with article-holding shelves pivoted to said conveyor for vertical swinging movement relatively thereto, means for holding the shelves on the downwardly moving run substantially horizontal during the major portion of their travel, the construction being such that the shelves on the upwardly moving run are disposed substantially vertical and in overlapping relation, means for intermittently operating the conveyor and successively advancing said shelves to a delivery station, and empty lock means positioned at the delivery station within the path of movement of the shelves acting to permit complete operation of the machine when an article is disposed on the shelf at the delivery station and to prevent complete operation of the machine when no article is disposed on said last-named shelf, said empty lock means comprising a movable member located in the path of movement of the shelves.

18. In a vending machine, an endless conveyor having an upwardly moving run and a downwardly moving run, said conveyor being provided with article-holding shelves pivoted to said conveyor for vertical swinging movement relatively thereto, means for holding the shelves on the downwardly moving run substantially horizontal during the major portion of their travel, the construction being such that the shelves on the upwardly moving run are disposed substantially vertical and in overlapping relation, means for intermittently operating the conveyor and successively advancing said shelves to a delivery station for discharge of an article from the machine, and empty lock means in a position to be actuated by the weight of the articles acting to permit complete operation of the machine when an article is delivered through the delivery station and to prevent complete operation of the machine when no article is delivered through the delivery station, said empty lock means comprising a movable member located in a position to be actuated by articles passing through said delivery station.

19. In a vending machine, an endless conveyor having an upwardly moving run and a downwardly moving run, said conveyor being provided with article-holding shelves pivoted to said conveyor for vertical swinging movement relatively thereto, means for holding the shelves in projected article-holding position during the major portion of their travel on the downwardly moving run and for successively releasing said shelves for tilting movement for the discharge of articles from said shelves at an article delivery station adjacent the lower end of said downwardly moving run, the construction being such that said shelves, on the upwardly moving run, are folded upon the conveyor, operable means to actuate the machine for the delivery therefrom of an article to be vended, comprising means for intermittently operating the conveyor to successively advance said shelves to and through the delivery station, and empty lock means at the delivery station in position to be actuated by the weight of an article in moving through the delivery station, said empty lock means acting to permit complete operation of the machine in delivering an article from the machine through the delivery station and to prevent complete operation of the machine when no article is delivered through the delivery station in response to the actuation of said operable means, said empty lock means comprising a movable member located in position to be influenced by the weight of an article at the delivery station.

20. In a vending machine, an endless conveyor having an upwardly moving run and a downwardly moving run, comprising a chain consisting of pairs of links alternating with single links, means for driving said chain, comprising a sprocket having alternate chain driving tines in relatively offset position, whereby certain of said tines engage between said pairs of links and adjacent tines drivingly engage the conveyor on one side of the single links, said conveyor being provided with article-holding shelves pivoted to said conveyor for vertical swinging movement relatively thereto, means for holding the shelves in projected article-holding position during the major portion of their travel on the downwardly moving run and for successively releasing said shelves for tilting movement for the discharge of articles from said shelves at an article delivery station adjacent the lower end of said downwardly moving run, the construction being such that said shelves, on the upwardly moving run, are folded upon the conveyor, operable means to actuate the machine for the delivery therefrom of an article to be vended, comprising means for intermittently operating the conveyor to successively advance said shelves to and through the delivery station, and empty lock means at the delivery station in position to be actuated by the weight of an article in moving through the delivery station, said empty lock means acting to permit complete operation of the machine in delivering an article from the machine through the delivery station and to prevent complete operation of the machine when no article is delivered through the delivery station in response to the actuation of said operable means, said empty lock means comprising a movable member located in position to be influenced by the weight of an article at the delivery station.

21. In a vending machine, an endless conveyor having an upwardly moving run and a downwardly moving run, said conveyor comprising link sections, pivot pins pivotally connecting the link sections together in end-to-end relationship, the link sections alternately comprising a pair of spaced link elements forming one section and a connecting link element forming the adjacent section and pivoted to and between the ends of the spaced link elements of adjacent sections, article-holding shelves pivotally mounted on link pivots of said conveyor for relative vertical swinging movement with respect to the conveyor, each shelf being formed with a supporting lug thereon, guide means disposed adjacent the downwardly moving run of said conveyor in position to engage said lugs for holding the shelves in projected position extending outwardly from the conveyor during movement on said downwardly moving run, said guide means being formed to successively release said shelves at an article delivery station at or adjacent the lower terminus of said downwardly moving run for downwardly tilting movement for the discharge therefrom of articles supported thereon, a sprocket for intermittently shifting the conveyor and successively advancing said shelves each to the delivery station, said sprocket comprising conveyor driving tines disposed in relatively offset planes, whereby the tines lying in a common plane may drivingly engage the conveyor between the spaced link elements thereof and the remaining tines may drivingly engage the conveyor at the side of the connecting link elements, and empty lock means at the delivery station in position to be actuated by the weight of an article in moving through the delivery station, said empty lock means acting to permit complete operation of the machine when an article is delivered and to prevent complete operation of the machine when no article is delivered through the delivery station, said empty lock means comprising a movable member located in position to be influenced by the weight of an article at the delivery station.

ARTHUR H. WOODWARD.
WILLIAM E. RICHMOND.
ERNEST H. THOMPSON.